United States Patent
Matsuura

(10) Patent No.: US 12,342,094 B2
(45) Date of Patent: Jun. 24, 2025

(54) SOLID-STATE IMAGING ELEMENT

(71) Applicant: Sony Semiconductor Solutions Corporation, Kanagawa (JP)

(72) Inventor: Kouji Matsuura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 155 days.

(21) Appl. No.: 18/258,687

(22) PCT Filed: Jan. 20, 2022

(86) PCT No.: PCT/JP2022/001906
§ 371 (c)(1),
(2) Date: Jun. 21, 2023

(87) PCT Pub. No.: WO2022/172714
PCT Pub. Date: Aug. 18, 2022

(65) Prior Publication Data
US 2024/0171881 A1    May 23, 2024

(30) Foreign Application Priority Data

Feb. 9, 2021   (JP) ................. 2021-019126

(51) Int. Cl.
*H04N 25/78* (2023.01)
*H04N 25/40* (2023.01)
(Continued)

(52) U.S. Cl.
CPC ............. *H04N 25/78* (2023.01); *H04N 25/40* (2023.01); *H04N 25/57* (2023.01); *H04N 25/59* (2023.01)

(58) Field of Classification Search
CPC ........ H04N 25/40; H04N 25/57; H04N 25/59; H04N 25/78
See application file for complete search history.

(56) References Cited

U.S. PATENT DOCUMENTS 11,165,983 B1 * 11/2021 Park ................. H04N 25/616
2012/0256077 A1 * 10/2012 Yen ................. H04N 25/59
                                                                 250/208.1
(Continued)

FOREIGN PATENT DOCUMENTS

| JP | 2015119340 A | 6/2015 |
| JP | 2017175345 A | 9/2017 |
| JP | 2019057873 A | 4/2019 |

OTHER PUBLICATIONS

International Search Report (PCT/ISA/210), International Application No. PCT/JP2021/001906, dated Mar. 22, 2022.

*Primary Examiner* — Lin Ye
*Assistant Examiner* — Chriss S Yoder, III
(74) *Attorney, Agent, or Firm* — Michael Best & Friedrich LLP

(57) ABSTRACT

There is provided a solid-state imaging element capable of performing AD conversion on pixel signals in a wide dynamic range in a short time.
A solid-state imaging device according to the present disclosure includes: a pixel section including photoelectric conversion elements that photoelectrically convert incident light into pixel signals; an AD conversion section that converts the pixel signals from the pixel section into digital signals; a first holding circuit that is provided between the pixel section and the AD conversion section and holds the pixel signals; a second holding circuit that is provided between the pixel section and the AD conversion section and holds the pixel signals; and a selection circuit that is capable of connecting any one of the first and second holding circuits to the AD conversion section and selectively transmits the pixel signals held in the first or second holding circuit to the AD conversion section.

16 Claims, 26 Drawing Sheets

(51) Int. Cl.
*H04N 25/57* (2023.01)
*H04N 25/59* (2023.01)

(56) References Cited

U.S. PATENT DOCUMENTS

2021/0029312 A1\* 1/2021 Geurts ................... H04N 25/77
2021/0144330 A1\* 5/2021 Otaka .................... H04N 25/78

\* cited by examiner

SOLID-STATE IMAGING ELEMENT

TECHNICAL FIELD

The present disclosure relates to a solid-state imaging element.

BACKGROUND ART

There is a complementary metal oxide semiconductor (CMOS) image sensor (hereinafter, also referred to as a CIS) that performs analogue-to-digital (AD) conversion on an analog pixel signal by comparing the pixel signal with a linearly changing reference signal by a comparator and counting the time until the reference signal crosses the pixel signal. In order to expand the dynamic range of the comparator, an AD converter of the CIS may change the sensitivity or conversion efficiency of a pixel and perform AD conversion on a pixel charge a plurality of times.

CITATION LIST

Patent Document

Patent Document 1: Japanese Patent Application Laid-Open No. 2017-175345

SUMMARY OF THE INVENTION

Problems to be Solved by the Invention

However, since AD conversion requires a settling period to be executed after the voltage of a floating diffusion layer is stabilized, it takes a long time to execute AD conversion a plurality of times while the sensitivity or conversion efficiency of the same pixel is changed.

Therefore, there is provided a solid-state imaging element capable of performing AD conversion on pixel signals in a wide dynamic range in a short time.

Solutions to Problems

A solid-state imaging device according to one aspect of the present disclosure includes: a pixel section including photoelectric conversion elements that photoelectrically convert incident light into pixel signals; an AD conversion section that converts the pixel signals from the pixel section into digital signals; a first holding circuit that is provided between the pixel section and the AD conversion section and holds the pixel signals; a second holding circuit that is provided between the pixel section and the AD conversion section and holds the pixel signals; and a selection circuit that is capable of connecting any one of the first and second holding circuits to the AD conversion section and selectively transmits the pixel signals held in the first or second holding circuit to the AD conversion section.

The solid-state imaging device further includes a bypass signal line that is provided between the pixel section and the AD conversion section and transmits the pixel signals as it is, and the selection circuit is capable of connecting any one of the first holding circuit, the second holding circuit, and the bypass signal line to the AD conversion section, and selectively transmits, to the AD conversion section, the pixel signals held in the first holding circuit, the pixel signals held in the second holding circuit, or the pixel signals transmitted through the bypass signal line.

The first holding circuit includes: a first capacitor having one end connected to the pixel section, the first capacitor being capable of accumulating the pixel signals; and a first transistor having a gate connected to another end of the first capacitor and a drain connected to a current source and the selection circuit, and the second holding circuit includes: a second capacitor having one end connected to the pixel section, the second capacitor being capable of accumulating the pixel signals; and a second transistor having a gate connected to another end of the second capacitor and a drain connected to a current source and the selection circuit.

The first holding circuit includes: a first switch provided between the first capacitor and the pixel section;
 a second switch connected between the drain of the first transistor and the one end of the first capacitor; and a third switch connected between the drain of the first transistor and the another end of the first capacitor, and the second holding circuit includes: a fourth switch provided between the second capacitor and the pixel section; a fifth switch connected between the drain of the second transistor and the one end of the second capacitor; and a sixth switch connected between the drain of the second transistor and the another end of the second capacitor.

The first and third switches are brought into a conductive state and the second switch is in a non-conductive state when the pixel signals are sampled from the pixel section to the first capacitor, the first and third switches are brought into a non-conductive state and the second switch is brought into a conductive state when the first capacitor holds the pixel signals, the fourth and sixth switches are brought into a conductive state and the fifth switch is in a non-conductive state when the pixel signals are sampled from the pixel section to the second capacitor, and the fourth and sixth switches are brought into a non-conductive state and the fifth switch is brought into a conductive state when the second capacitor holds the pixel signals.

The first and second holding circuits sample the pixel signals at different timings.

During a period in which the first holding circuit holds a first pixel signal among the pixel signals and the selection circuit outputs the first pixel signal from the first holding circuit to the AD conversion section, the second holding circuit samples a second pixel signal among the pixel signals, and during a period in which the second holding circuit holds the second pixel signal and the selection circuit outputs the second pixel signal from the second holding circuit to the AD conversion section, the first holding circuit samples another pixel signal among the pixel signals.

The first holding circuit includes: a first capacitor having one end connected to the pixel section and another end connected to a reference voltage source, the first capacitor being capable of storing the pixel signals; a first transistor having a gate connected to the one end of the first capacitor and a source connected to a current source and the selection circuit, and the second holding circuit includes: a second capacitor having one end connected to the pixel section and another end connected to a reference voltage source, the second capacitor being capable of accumulating the pixel signals; and a second transistor having a gate connected to the one end of the second capacitor and a source connected to a current source and the selection circuit.

The first holding circuit includes a first switch provided between the one end of the first capacitor and the pixel section, and the second holding circuit includes a second switch provided between the one end of the second capacitor and the pixel section.

The first switch is brought into a conductive state when the pixel signals are sampled from the pixel section to the first capacitor, the first switch is brought into a non-conductive state when the first capacitor holds the pixel signals, the second switch is brought into a conductive state when the pixel signals are sampled from the pixel section to the second capacitor, and the second switch is brought into a non-conductive state when the second capacitor holds the pixel signals.

The first and second capacitors sample the pixel signals at different timings.

During a period in which the first holding circuit holds a first pixel signal among the pixel signals and the selection circuit outputs the first pixel signal from the first holding circuit to the AD conversion section, the second holding circuit samples a second pixel signal among the pixel signals, and during a period in which the second holding circuit holds the second pixel signal and the selection circuit outputs the second pixel signal from the second holding circuit to the AD conversion section, the first holding circuit samples another pixel signal among the pixel signals.

The solid-state imaging device further includes a negative capacitance circuit connected to a first signal line that is connected between the pixel section and the first and second holding circuits and transmits the pixel signals, and the negative capacitance circuit includes: an amplifier having an input terminal connected to the first signal line; and a capacitor connected between the input terminal and an output terminal of the amplifier.

Each pixel of the pixel section includes first and second photoelectric conversion elements having different light receiving areas.

Each pixel of the pixel section includes: first and second floating diffusion layers each of which accumulates a charge from the photoelectric conversion elements; an amplification transistor that outputs the pixel signals based on a potential of the first floating diffusion layer; and a seventh switch provided between the first floating diffusion layer and the second floating diffusion layer, the amplification transistor outputs the pixel signals based on the potential of the first floating diffusion layer when the seventh switch is brought into a non-conductive state, and the amplification transistor outputs the pixel signals based on a potential of a region where the first and second floating diffusion layers are coupled when the seventh switch is brought into a conductive state.

The first holding circuit further includes a third transistor and an eighth switch connected in series between a power supply and the drain of the first transistor, and the second holding circuit further includes a fourth transistor and a ninth switch connected in series between the power supply and the drain of the second transistor.

The third transistor and the eighth switch are connected in parallel to the current source, and the fourth transistor and the ninth switch are connected in parallel to the current source.

The solid-state imaging device further includes a voltage generation circuit that applies a predetermined first voltage to gates of the third and fourth transistors, and the third transistor sets the drain of the first transistor to a clamp voltage corresponding to the first voltage when the eighth switch is in a conductive state, and the fourth transistor sets the drain of the second transistor to the clamp voltage when the ninth switch is in a conductive state.

The eighth switch is brought into a conductive state in an auto-zero operation of equalizing the pixel signals that are held by the first holding circuit and compared in the AD conversion section and a reference signal, and the ninth switch is brought into conductive state in an auto-zero operation of equalizing the pixel signals that are held by the second holding circuit and compared in the AD conversion section and the reference signal.

MODE FOR CARRYING OUT THE INVENTION

Hereinafter, specific embodiments to which the present technology is applied will be described in detail with reference to the drawings. The drawings are schematic or conceptual, and the ratio of each portion and the like are not necessarily the same as actual ones. In the description and the drawings, elements similar to the elements previously described with reference to previously described drawings are denoted by the same reference signs, and detailed descriptions thereof are appropriately omitted.

First Embodiment

Figure 1:
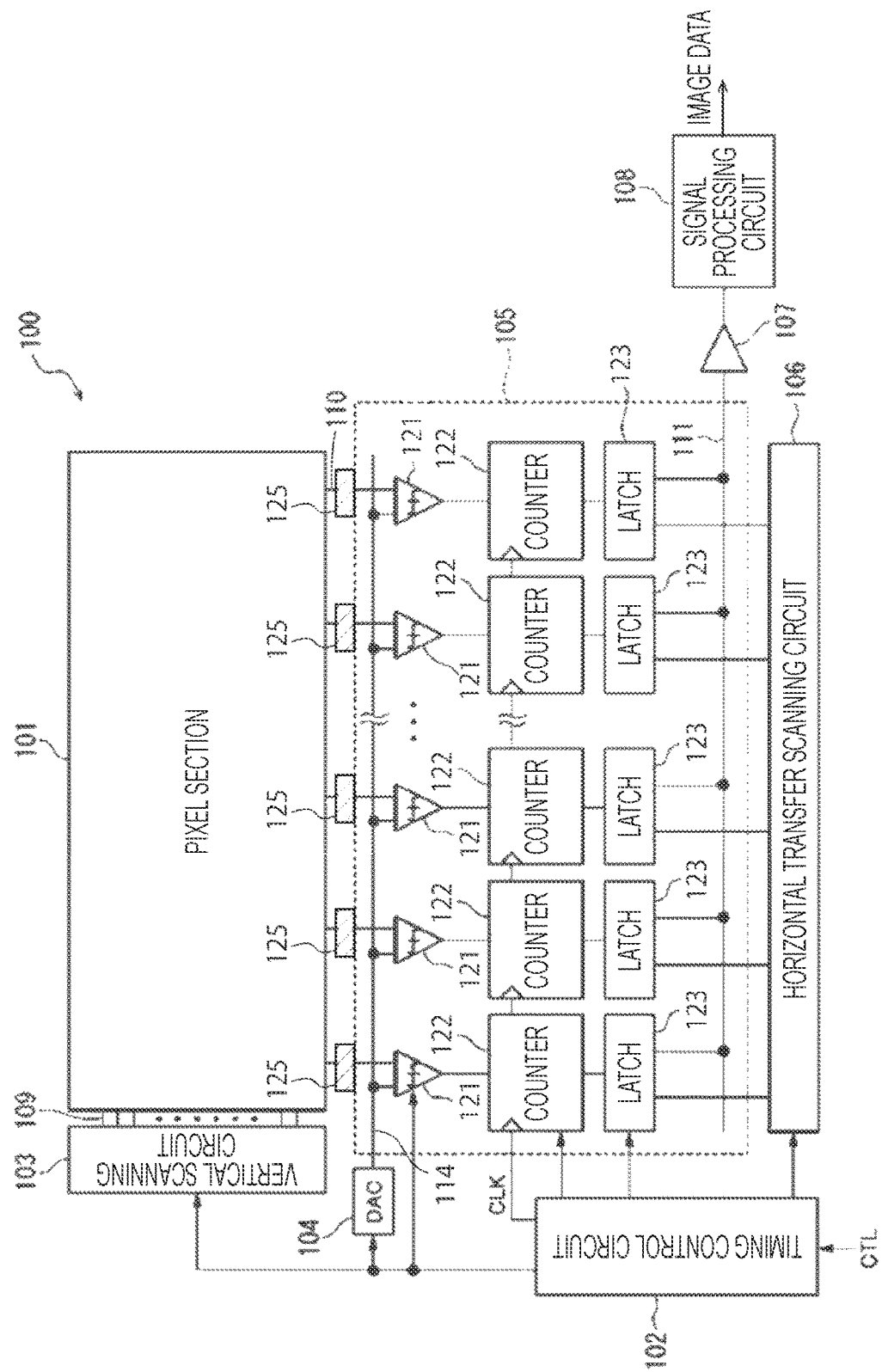
FIG. 1 is a block diagram illustrating a configuration example of a solid-state imaging element according to a first embodiment.

FIG. 1 is a block diagram illustrating a configuration example of a solid-state imaging device 100 according to a first embodiment. The solid-state imaging device 100 includes a pixel section 101, a timing control circuit 102, a vertical scanning circuit 103, a digital-analog conversion device (DAC) 104, sample-and-hold (SH) sections 125, an analog-digital conversion device (ADC) group 105, a horizontal transfer scanning circuit 106, an amplifier circuit 107, and a signal processing circuit 108.

In the pixel section 101, unit pixels (hereinafter, also simply referred to as pixels) each including a photoelectric conversion element that photoelectrically converts incident light into a charge amount (pixel signal) corresponding to the light amount of the incident light are arranged in a matrix. A specific circuit configuration of the unit pixel will be described later with reference to FIG. 2. Furthermore, in the pixel section 101, a pixel drive line 109 is wired for each row along the left-right direction in the drawing (pixel array direction of pixel row/horizontal direction), and a vertical signal line 110 is wired for each column along the up-down direction in the drawing (pixel array direction of pixel column/vertical direction) with respect to the pixel array in a matrix. One ends of the pixel drive lines 109 are connected to output ends of the vertical scanning circuit 103 corresponding to the rows. Note that, although one pixel drive line 109 is illustrated for each pixel row in FIG. 1, two or more pixel drive lines 109 may be provided for each pixel row.

The timing control circuit 102 includes a timing generator (not illustrated) that generates various timing signals. The timing control circuit 102 performs drive control of the vertical scanning circuit 103, the DAC 104, the ADC group 105, the horizontal transfer scanning circuit 106, and the like on the basis of various timing signals generated by the timing generator on the basis of control signals or the like provided from the outside.

The vertical scanning circuit 103 includes a shift register, an address decoder, and the like. Although a specific configuration is not illustrated here, the vertical scanning circuit 103 includes a reading scanning system and a sweeping scanning system.

The reading scanning system sequentially performs selective scanning in units of row for unit pixels from which signals are read. Meanwhile, the sweeping scanning system performs, on a read row on which the reading scanning is performed by the reading scanning system, sweeping scanning to sweep (reset) unnecessary charges from the photoelectric conversion elements of the unit pixels in the read row prior to the reading scanning by a time corresponding to a shutter speed. The unnecessary charges are swept (reset) by the sweeping scanning system, so that a so-called electronic shutter operation is performed. Here, the electronic shutter operation is intended to mean an operation of discharging the optical charges of the photoelectric conversion elements and newly starting exposure (starting accumulating optical charges). A signal read by the reading operation by the reading scanning system corresponds to the amount of light incident after the immediately preceding reading operation or electronic shutter operation. Then, a period from the reading timing by the immediately preceding reading operation or the sweeping timing by the electronic shutter operation to the reading timing by the current reading operation is an optical charge accumulation time (exposure time) in a unit pixel.

The pixel signals (analog signals) output from the unit pixels of the pixel row selectively scanned by the vertical scanning circuit 103 are supplied to the SH sections 125 and the ADC group 105 via the plurality of vertical signal lines 110 corresponding to the columns.

The SH sections 125 are provided between the pixel section 101 and the ADC group 105, receive the pixel signals via the vertical signal lines 110, and hold the pixel signals. The SH sections 125 output the held pixel signals to comparators 121 of the ADC group 105 at a desired timing.

The DAC 104 as a reference signal generation unit generates a reference signal RAMP as a signal having a linearly changing ramp waveform, and supplies the reference signal RAMP to the ADC group 105. The DAC 104 is commonly connected to the plurality of comparators 121 via a reference signal line 114, and supplies the same reference signal RAMP to the plurality of comparators 121. The reference signal line 114 transmits the reference signal RAMP to the plurality of comparators 121.

The ADC group 105 includes the plurality of comparators 121, a plurality of counters 122, and a plurality of latch circuits 123. The ADC group 105 converts the pixel signals (analog signals) from the pixel section 101 into digital signals.

One comparator 121, one counter 122, and one latch circuit 123 are each provided corresponding to a pixel column of the pixel section 101, and constitute an ADC.

The comparator 121 compares the voltage of a signal obtained by adding a pixel signal output from each pixel and the reference signal RAMP via a capacitor with a predetermined reference voltage, and supplies an output signal indicating a comparison result to the counter 122.

On the basis of the output signal of the comparator 121, the counter 122 counts the time until the magnitude relationship of the voltage between the pixel signal and the reference signal RAMP is inverted. As a result, the analog pixel signal is converted into a digital pixel signal represented by the count value. The counter 122 supplies the count value to the latch circuit 123.

The latch circuit 123 holds the count value supplied from the counter 122. Furthermore, the latch circuit 123 performs correlated double sampling (CDS) by taking a difference between a data signal count value corresponding to the pixel signal at the signal level and a reset signal count value corresponding to the pixel signal at the reset level.

The horizontal transfer scanning circuit 106 includes a shift register, an address decoder and the like, and sequentially performs selective scanning on circuit portions of the ADC group 105 corresponding to the pixel columns. By the selective scanning by the horizontal transfer scanning circuit 106, the digital pixel signals held in the latch circuits 123 are sequentially transferred to the amplifier circuit 107 via a horizontal transfer line 111.

The amplifier circuit 107 amplifies the digital pixel signals supplied from the latch circuits 123 and supplies the amplified digital pixel signals to the signal processing circuit 108.

The signal processing circuit 108 performs predetermined signal processing on the digital pixel signals supplied from the amplifier circuit 107 to generate two-dimensional image data. For example, the signal processing circuit 108 corrects a vertical line defect or a point defect, clamps the signals, or performs digital signal processing such as parallel-to-serial conversion, compression, encoding, addition, averaging, and intermittent operation. The signal processing circuit 108 outputs the generated image data to a subsequent device.

Note that the solid-state imaging device 100 illustrated in FIG. 1 may be configured as one semiconductor chip as a whole, or may be configured by a plurality of semiconductor chips. In a case where the solid-state imaging device 100 is configured as a plurality of semiconductor chips, the pixel section 101 and the other processing circuits may be formed as separate semiconductor chips 511 and 512, and the semiconductor chip 511 and the semiconductor chip 512 may be stacked.

Figure 2:
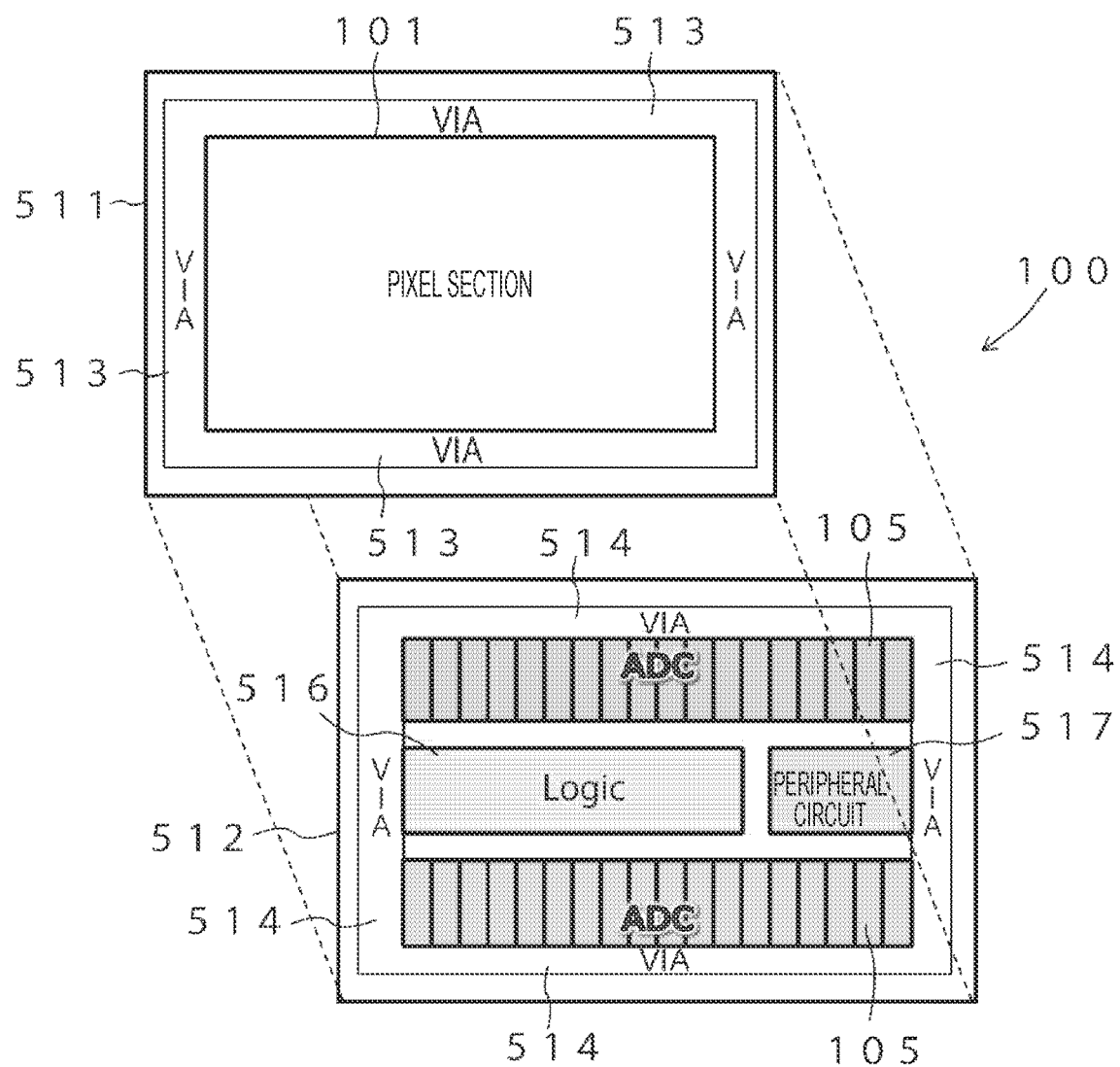
FIG. 2 is a conceptual diagram illustrating an example of the solid-state imaging element in which a semiconductor chip of a pixel section and a semiconductor chip of processing circuits are stacked.

For example, FIG. 2 is a conceptual diagram illustrating an example of the solid-state imaging device 100 in which the semiconductor chip 511 of the pixel section 101 and the semiconductor chip 512 of the processing circuits are stacked. As illustrated in FIG. 2, the solid-state imaging device 100 includes two stacked semiconductor chips 511 and 512. Note that the number of stacked semiconductor chips may be three or more.

The semiconductor chip 511 includes the pixel section 101 formed on a semiconductor substrate. The semiconductor chip 512 includes the ADC group 105, a logic circuit 516, and a peripheral circuit 517 formed on another semiconductor substrate. The logic circuit 516 includes the timing control circuit 102, the vertical scanning circuit 103, the DAC 104, the horizontal transfer scanning circuit 106, and the like. The peripheral circuit 517 includes the processing circuit 108 and the like.

Each pixel of the pixel section 101 of the semiconductor chip 511 and elements of the processing circuits (105, 516, and 517) of the semiconductor chip 512 may be electrically connected by use of, for example, a through electrode or the like such as a through silicon via (TSV) provided in via regions 513 and 514. The ADC group 105 can transmit and receive signals to and from the pixel section 101 via the TSV. In addition, both semiconductor chips may be bonded (Cu—Cu bonding) so that the wiring of the semiconductor chip 511 and the wiring of the semiconductor chip 512 are brought into contact with each other. Furthermore, although not illustrated, the pixel section 101 and a part of the processing circuits (105, 516, and 517) may be configured as one semiconductor chip 511, and the other components may be configured as another semiconductor chip 512.

(Circuit Configuration of Unit Pixel PX)

Figure 3:
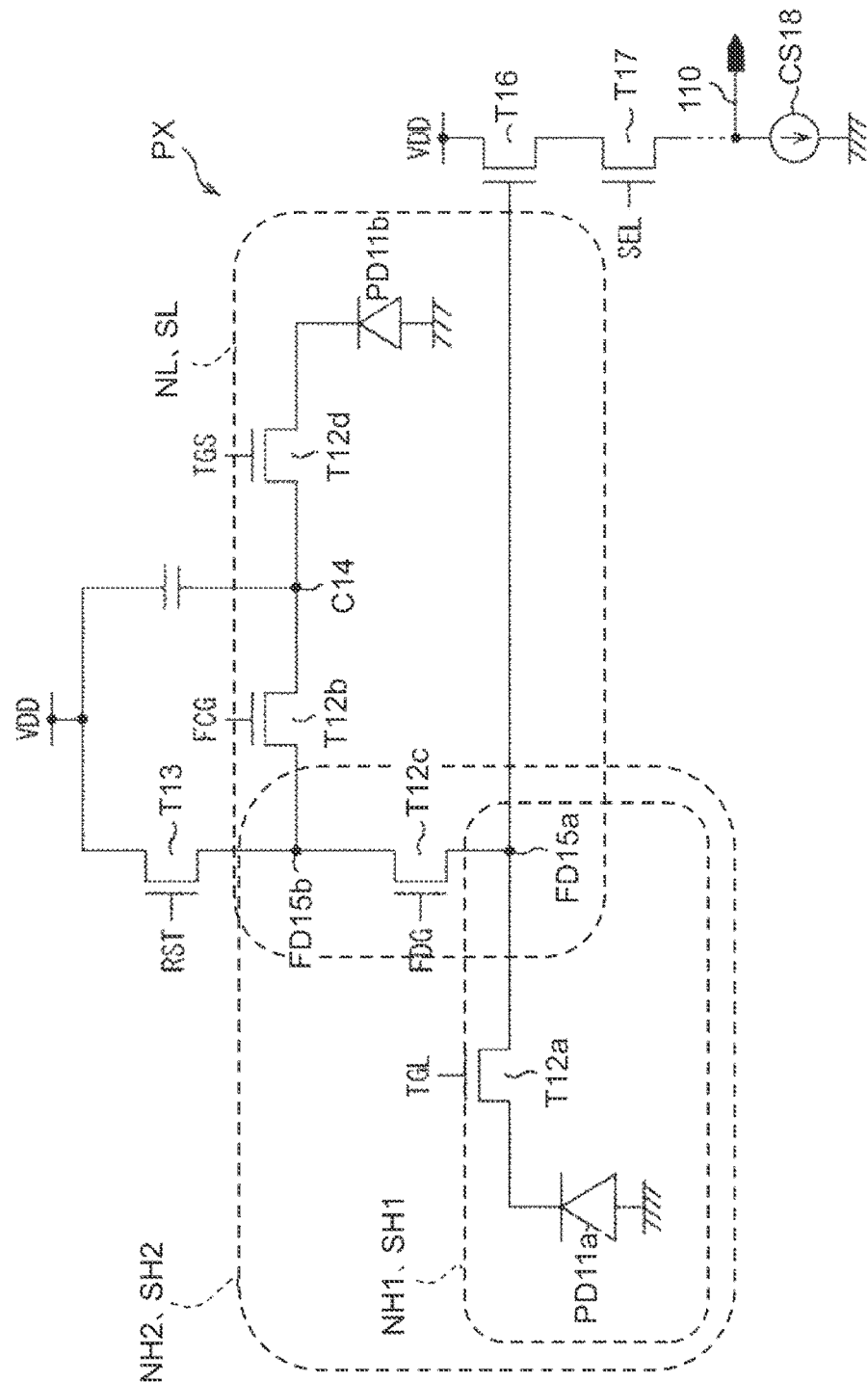
FIG. 3 is a circuit diagram illustrating a configuration example of a unit pixel arranged in the pixel array section.

FIG. 3 is a circuit diagram illustrating a configuration example of a unit pixel PX arranged in the pixel array section 11.

The unit pixel PX includes a first photoelectric conversion section PD11a, a second photoelectric conversion section PD11b, first to fourth transfer gate sections T12a to T12d, a reset gate section T13, a charge accumulation section C14, a first floating diffusion (FD) section FD15a, a second floating diffusion (FD) section FD15b, an amplification transistor T16, and a selection transistor T17.

Furthermore, for the unit pixel PX, a plurality of drive lines as the pixel drive lines 109 in FIG. 1 is wired, for example, for each pixel row. Then, various drive signals TGL, FCG, FDG, TGS, RST, and SEL are supplied from the vertical scanning circuit 103 in FIG. 1 via the plurality of drive lines. Since each transistor of the unit pixel PX is an NMOS transistor, these drive signals are pulse signals that are brought into the active state in the high level state (for example, power supply voltage VDD) and are brought into the inactive state in the low level state (for example, negative potential).

The first photoelectric conversion section PD11a includes, for example, a PN-junction photodiode. The first photoelectric conversion section PD11a generates and accumulates a charge corresponding to the light amount of received light.

Similarly to the first photoelectric conversion section PD11a, the second photoelectric conversion section PD11b includes, for example, a PN-junction photodiode. The second photoelectric conversion section PD11b generates and accumulates a charge corresponding to the light amount of received light.

Comparing the first photoelectric conversion section PD11a and the second photoelectric conversion section PD11b, the first photoelectric conversion section PD11a has a larger light receiving surface area than the second photoelectric conversion section PD11b, and has higher sensitivity.

The first transfer gate section T12a is connected between the first photoelectric conversion section PD11a and the first FD section FD15a. The drive signal TGL is applied to a gate electrode of the first transfer gate section T12a. When the drive signal TGL is brought into the active state, the first transfer gate section T12a is brought into the conductive state, and the charge accumulated in the first photoelectric conversion section PD11a is transferred to the first FD section FD15a via the first transfer gate section T12a.

The second transfer gate section T12b is connected between the charge accumulation section 104 and the second FD section FD15b. The drive signal FCG is applied to a gate electrode of the second transfer gate section T12b. When the drive signal FCG is brought into the active state, the second transfer gate section T12b is brought into the conductive state, and the potentials of the charge accumulation section 104 and the second FD section FD15b are coupled.

The third transfer gate section T12c is connected between the first FD section FD15a and the second FD section FD15b. The drive signal FDG is applied to a gate electrode of the third transfer gate section T12c. When the drive signal FDG is brought into the active state, the third transfer gate section T12c is brought into the conductive state, and the potentials of the first FD section FD15a and the second FD section FD15b are coupled.

The fourth transfer gate section T12d is connected between the second photoelectric conversion section PD11b and the charge accumulation section C14. The drive signal TGS is applied to a gate electrode of the fourth transfer gate section T12d. When the drive signal TGS is brought into the active state, the fourth transfer gate section T12d is brought into the conductive state, and the charge accumulated in the second photoelectric conversion section PD11b is transferred to the charge accumulation section C14 via the fourth transfer gate section T12d.

In addition, the region under the gate electrode of the fourth transfer gate section T12d has a slightly deeper potential, and an overflow path is formed to transfer the charge exceeding the saturation charge amount of the second photoelectric conversion section PD11b and overflowing from the second photoelectric conversion section PD11b to the charge accumulation section C14. Note that, hereinafter, the overflow path formed in the region under the gate electrode of the fourth transfer gate section T12d will be simply referred to as the overflow path of the fourth transfer gate section T12d.

The reset gate section T13 is connected between a power supply that supplies a power supply voltage VDD (hereinafter, a power supply may also be referred to as VDD) and the second FD section FD15b. The drive signal RST is applied to a gate electrode of the reset gate section T13. When the drive signal RST is brought into the active state, the reset gate section T13 is brought into the conductive state. As a result, for example, the potential of the region where the potentials of the first FD section FD15a and the second FD section FD15b are coupled or the potential of the region where the potentials of the charge accumulation section C14, the first FD section FD15a, and the second FD section FD15b are coupled is reset to the level of the power supply voltage VDD.

The charge accumulation section C14 includes, for example, a capacitor, and opposing electrodes of the charge accumulation section C14 are connected between the power supply VDD. The charge accumulation section C14 accumulates the charge transferred from the second photoelectric conversion section PD11b.

The first FD section FD15a and the second FD section FD15b perform charge-voltage conversion on the charge in the first or second photoelectric conversion section PD11a or PD11b into a voltage signal and output the voltage signal. The capacitance of the entire FD section of the pixel PX can be switched by electrical coupling or disconnection of the first FD section FD15a and the second FD section FD15b. Switching the capacitance of the FD section of the pixel PX enables the pixel PX to output pixel signals with a plurality of charge-voltage conversion efficiencies.

The amplification transistor T16 has a gate electrode connected to the first FD section FD15a and a drain electrode connected to a power supply VDD, and serves as an input unit of a read circuit that reads the charge held in the first FD section FD15a, which is a so-called source follower circuit. That is, the amplification transistor T16 has a source electrode connected to the vertical signal line 110 via the selection transistor T17, thereby constituting a source follower circuit together with a constant current source CS18 connected to one end of the vertical signal line 110.

The selection transistor T17 is connected between the source electrode of the amplification transistor T16 and the vertical signal line 110. The drive signal SEL is applied to a gate electrode of the selection transistor T17. When the drive signal SEL is brought into the active state, the selection transistor T17 is brought into the conductive state, and the unit pixel PX is brought into the selected state. As a result, a pixel signal output from the amplification transistor T16 is output to the vertical signal line 110 via the selection transistor T17.

Note that, hereinafter, bringing each drive signal into the active state will also be referred to as turning on each drive signal, and bringing each drive signal into the inactive state will also be referred to as turning off each drive signal. In addition, hereinafter, bringing each gate section or each transistor into the conductive state will also be referred to as turning on each gate section or each transistor, and bringing each gate section or each transistor into the non-conductive state will also be referred to as turning off each gate section or each transistor.

(Operation of Unit Pixel PX)
(Operation Example at Start of Exposure of Unit Pixel PX)

Figure 4:
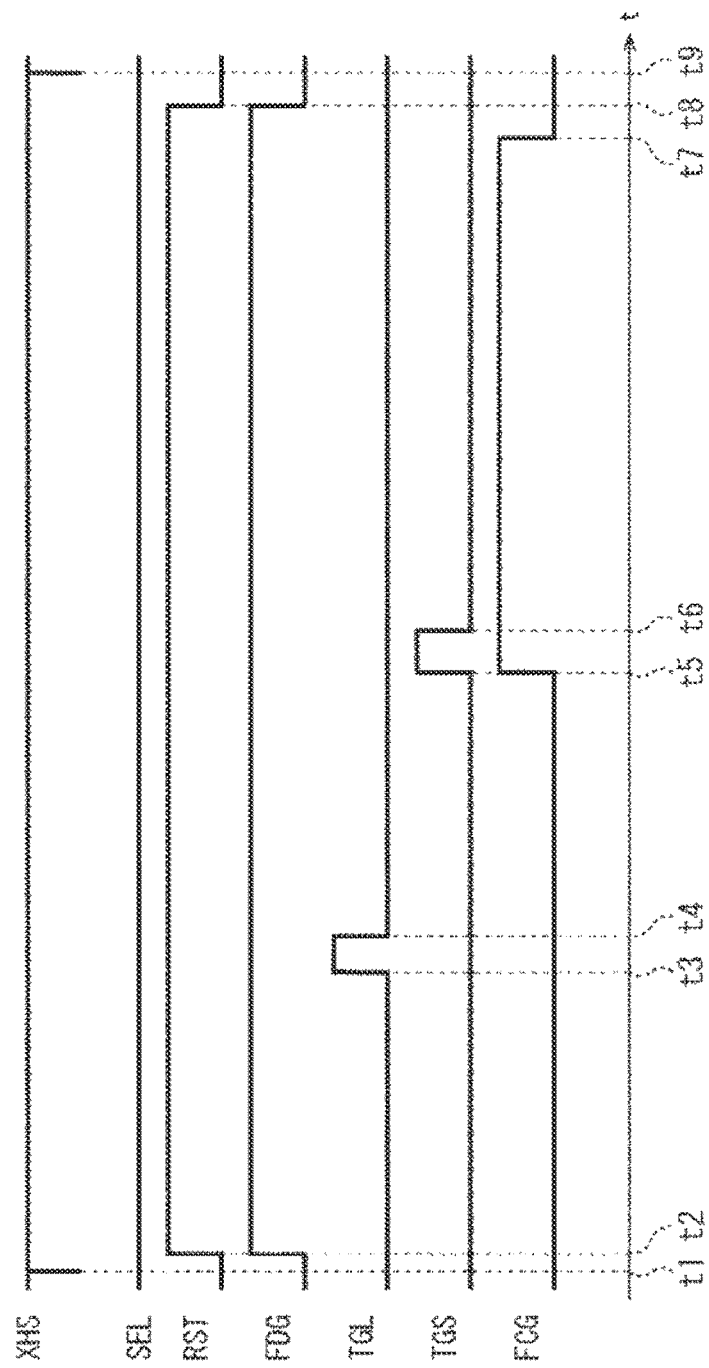
FIG. 4 is a timing chart of a horizontal synchronization signal and drive signals.

First, an operation example at the start of exposure of the unit pixel PX will be described with reference to the timing chart of FIG. 4. This processing is performed, for example, for each pixel row of the pixel array section 11 or for each plurality of pixel rows in a predetermined scanning order. Note that FIG. 4 illustrates a timing chart of a horizontal synchronization signal XHS and the drive signals SEL, RST, FDG, TGL, TGS, and FCG.

First, at time t1, the horizontal synchronization signal XHS is input, and exposure processing of the unit pixel PX is started.

Next, at time t2, the drive signals RST and FDG are turned on, and the reset gate section T13 and the third transfer gate section T12c are turned on. As a result, the potentials of the first FD section FD15a and the second FD section FD15b are coupled, and the potential of the coupled region is reset to the level of the power supply voltage VDD.

Next, at time t3, the drive signal TGL is turned on, and the first transfer gate section T12a is turned on. As a result, the charge accumulated in the first photoelectric conversion section PD11a is transferred to the region where the potentials of the first FD section FD15a and the second FD section FD15b are coupled via the first transfer gate section T12a, and the first photoelectric conversion section PD11a is reset.

Next, at time t4, the drive signal TGL is turned off, and the first transfer gate section T12a is turned off. As a result, accumulation of a charge in the first photoelectric conversion section PD11a is started, and an exposure period is started.

Next, at time t5, the drive signals TGS and FCG are turned on, and the fourth transfer gate section T12d and the second transfer gate section T12b are turned on. As a result, the potentials of the charge accumulation section C14, the first FD section FD15a, and the second FD section FD15b are coupled. In addition, the charge accumulated in the second photoelectric conversion section PD11b is transferred to the coupled region via the fourth transfer gate section T12d, and the second photoelectric conversion section PD11b and the charge accumulation section C14 are reset.

Next, at time t6, the drive signal TGS is turned off, and the fourth transfer gate section T12d is turned off. As a result, accumulation of a charge in the second photoelectric conversion section PD11b is started.

Next, at time t7, the drive signal FCG is turned off, and the second transfer gate section T12b is turned off. As a result, the charge accumulation section C14 starts to accumulate the charge overflowing from the second photoelectric conversion section PD11b and transferred via the overflow path of the fourth transfer gate section T12d.

Next, at time t8, the drive signals RST and FDG are turned off, and the reset gate section T13 and the third transfer gate section T12c are turned off.

Then, at time t9, the horizontal synchronization signal XHS is input.

(Operation Example at Time of Reading Unit Pixel PX)

Figure 5:
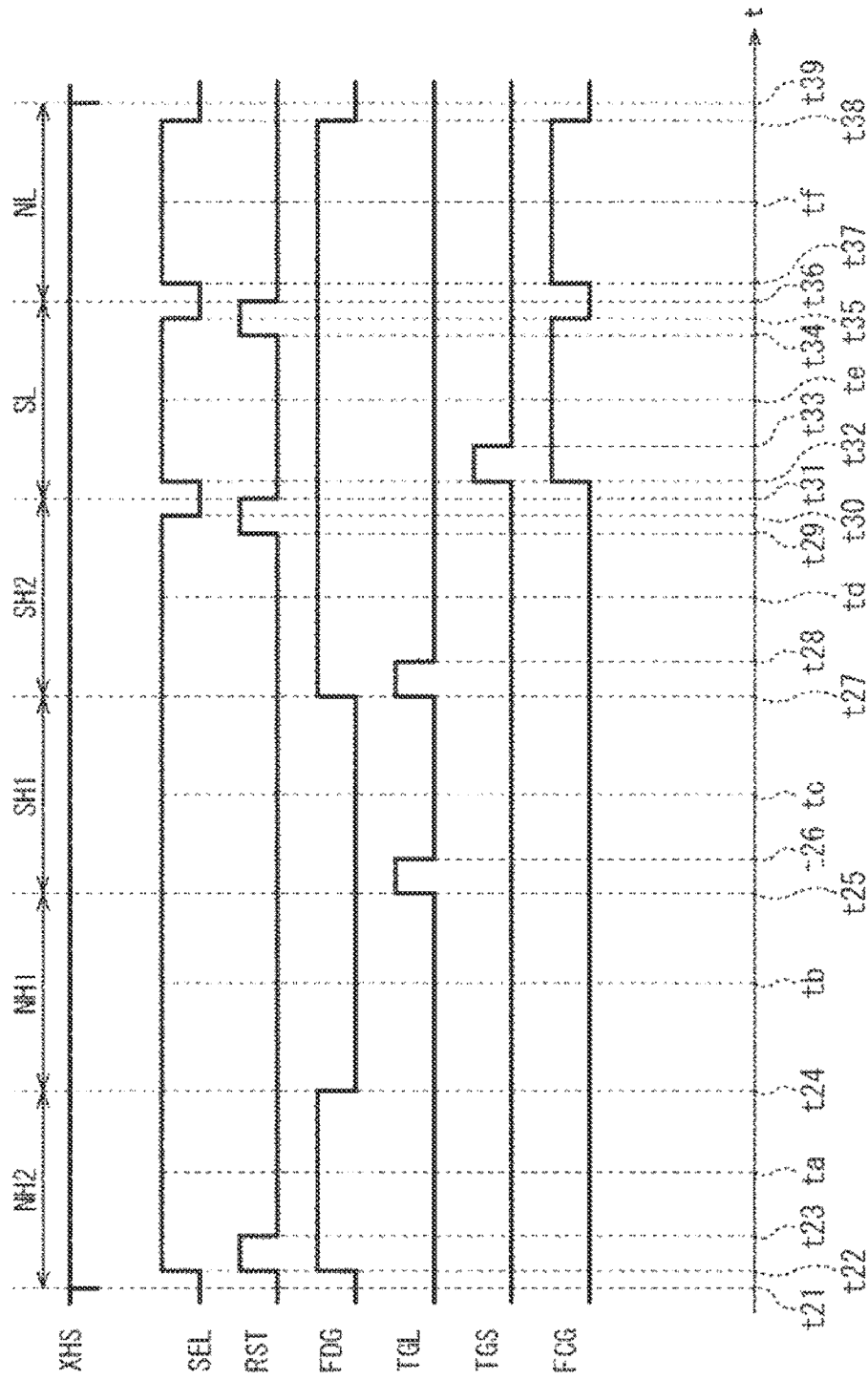
FIG. 5 is a timing chart of the horizontal synchronization signal and the drive signals.

Next, an operation example at the time of reading a pixel signal of the unit pixel PX will be described with reference to the timing chart of FIG. 5. This processing is performed, for example, for each pixel row of the pixel array section 11 or for each plurality of pixel rows in a predetermined scanning order after a predetermined time from when the processing of FIG. 4 is performed. Note that FIG. 5 illustrates a timing chart of the horizontal synchronization signal XHS and the drive signals SEL, RST, FDG, TGL, TGS, and FCG.

First, at time t21, the horizontal synchronization signal XHS is input, and a reading period of the unit pixel PX is started.

Next, at time t22, the drive signals SEL, RST, and FDG are turned on, and the selection transistor T17, the reset gate section T13, and the third transfer gate section T12c are turned on. As a result, the unit pixel PX is brought into the selected state. Furthermore, the potentials of the first FD section FD15a and the second FD section FD15b are coupled, and the potential of the coupled region is reset to the level of the power supply voltage VDD.

Next, at time t23, the drive signal RST is turned off, and the reset gate section T13 is turned off.

Next, at time ta between the time t23 and time t24, a signal NH2 based on the coupled potential of the first FD section FD15a and the second FD section FD15b is output to the vertical signal line 110 via the amplification transistor T16 and the selection transistor T17. The signal NH2 is a signal obtained by detecting the reset states of the first photoelectric conversion section PD11a, the FD section FD15a, and the FD section FD15b in FIG. 3 using the coupled region of the first FD section FD15a and the second FD section FD15b.

Note that, hereinafter, the signal NH2 will also be referred to as the high-sensitivity reset signal NH2.

Next, at the time t24, the drive signal FDG is turned off, and the third transfer gate section T12c is turned off. As a result, the potential coupling between the first FD section FD15a and the second FD section FD15b is resolved.

Next, at time tb between the time t24 and time t25, a signal NH1 based on the potential of the first FD section FD15a is output to the vertical signal line 110 via the amplification transistor T16 and the selection transistor T17. The signal NH1 is a signal obtained by detecting the reset states of the first photoelectric conversion section PD11a and the first FD section FD15a in FIG. 3 using the first FD section FD15a.

Note that, hereinafter, the signal NH1 will also be referred to as the high-sensitivity reset signal NH1.

Next, at the time t25, the drive signal TGL is turned on, and the first transfer gate section T12a is turned on. As a result, the charge generated and accumulated in the first photoelectric conversion section PD11a during the exposure period is transferred to the first FD section FD15a via the first transfer gate section T12a.

At the time t25, reading of the pixel signal is started, and the exposure period ends.

Next, at time t26, the drive signal TGL is turned off, and the first transfer gate section T12a is turned off. As a result, the transfer of the charge from the first photoelectric conversion section PD11a to the first FD section FD15a is stopped.

Next, at time tc between the time t26 and time t27, a signal SH1 based on the potential of the first FD section FD15a is output to the vertical signal line 110 via the amplification transistor T16 and the selection transistor T17. The signal SH1 is a signal based on the potential of the first FD section FD15a at the time when the charge generated in the first photoelectric conversion section PD11a during the exposure period is accumulated in the first FD section FD15a.

Note that, hereinafter, the signal SH1 will also be referred to as the high-sensitivity data signal SH1.

Next, at the time t27, the drive signals FDG and TGL are turned on, and the third transfer gate section T12c and the first transfer gate section T12a are turned on. As a result, the potentials of the first FD section FD15a and the second FD section FD15b are coupled, and the charge remaining in the first photoelectric conversion section PD11a without being transferred from the time t25 to the time t26 is transferred to the coupled region via the first transfer gate section T12a. Note that, at the time of reading the high-sensitivity data signal SH1, the capacitance for charge-voltage conversion is small with respect to the charge amount to be handled, and thus, there is no problem even if the charge remains in the first photoelectric conversion section PD11a. The charge remaining in the first photoelectric conversion section PD11a is only required to be able to be transferred at the time of reading a high-sensitivity data signal SH2, and the charge in the first photoelectric conversion section PD11a is not wasted.

Next, at time t28, the drive signal TGL is turned off, and the first transfer gate section T12a is turned off. As a result, the transfer of the charge from the first photoelectric conversion section PD11a to the region where the potentials of the first FD section FD15a and the second FD section FD15b are coupled is stopped.

Next, at time td between the time t28 and time t29, the signal SH2 based on the potential of the region where the potentials of the first FD section FD15a and the second FD section FD15b are coupled is output to the vertical signal line 110 via the amplification transistor T16 and the selection transistor T17. The signal SH2 is a signal based on the potential of the coupled region of the first FD section FD15a and the second FD section FD15b at the time when the charge generated in the first photoelectric conversion section PD11a during the exposure period is accumulated in the coupled region of the first FD section FD15a and the second FD section FD15b. Therefore, the capacitance for charge-voltage conversion at the time of reading the signal SH2 is the total capacitance of the first FD section FD15a and the second FD section FD15b, and is larger than that at the time of reading the high-sensitivity data signal SH1 at the time tc.

Note that, hereinafter, the signal SH2 will also be referred to as the high-sensitivity data signal SH2.

Next, at the time t29, the drive signal RST is turned on, and the reset gate section T13 is turned on. As a result, the potential of the region where the potentials of the first FD section FD15a and the second FD section FD15b are coupled is reset to the level of the power supply voltage VDD.

Next, at time t30, the drive signal SEL is turned off, and the selection transistor T17 is turned off. As a result, the unit pixel PX is brought into the non-selected state.

Next, at time t31, the drive signal RST is turned off, and the reset gate section T13 is turned off.

Next, at time t32, the drive signals SEL, TGS, and FCG are turned on, and the selection transistor T17, the fourth transfer gate section T12d, and the second transfer gate section T12b are turned on. As a result, the unit pixel PX is brought into the selected state. Furthermore, the potentials of the charge accumulation section C14, the first FD section FD15a, and the second FD section FD15b are coupled, and the charge accumulated in the second photoelectric conversion section PD11b is transferred to the coupled region. As a result, the charge accumulated in the second photoelectric conversion section PD11b and the charge accumulation section C14 during the exposure period is accumulated in the coupled region.

Next, at time t33, the drive signal TGS is turned off, and the fourth transfer gate section T12d is turned off. As a result, the transfer of the charge from the second photoelectric conversion section PD11b is stopped.

Next, at time te between the time t33 and time t34, a signal SL based on the potential of the coupled region of the charge accumulation section C14, the first FD section FD15a, and the second FD section FD15b is output to the vertical signal line 110 via the amplification transistor T16 and the selection transistor T17. The signal SL is a signal based on the potential of the coupled region of the charge accumulation section C14, the first FD section FD15a, and the second FD section FD15b at the time when the charge generated in the second photoelectric conversion section PD11b and accumulated in the second photoelectric conversion section PD11b and the charge accumulation section C14 is accumulated in the coupled region. Therefore, the capacitance for charge-voltage conversion at the time of reading the signal SL is the total capacitance of the charge accumulation section C14, the first FD section FD15a, and the second FD section FD15b. This capacitance is larger than that at the time of reading the high-sensitivity data signal SH1 at the time tc and that at the time of reading the high-sensitivity data signal SH2 at the time td.

Note that, hereinafter, the signal SL will also be referred to as the low-sensitivity data signal SL.

Next, at the time t34, the drive signal RST is turned on, and the reset gate section T13 is turned on. As a result, the coupled region of the charge accumulation section C14, the first FD section FD15a, and the second FD section FD15b is reset.

Next, at time t35, the drive signals SEL and FCG are turned off, and the selection transistor T17 and the second transfer gate section T12b are turned off. As a result, the unit pixel PX is brought into the non-selected state. Furthermore, the potential of the charge accumulation section C14 is separated from the potentials of the first FD section FD15a and the second FD section FD15b.

Next, at time t36, the drive signal RST is turned off, and the reset gate section T13 is turned off.

Next, at time t37, the drive signals SEL and FCG are turned on, and the selection transistor T17 and the second transfer gate section T12b are turned on. As a result, the unit pixel PX is brought into the selected state. Furthermore, the potential of the charge accumulation section C14 is coupled with the potentials of the first FD section FD15a and the second FD section FD15b.

Next, at time tf between the time t37 and time t38, a signal NL based on the potential of the coupled region of the charge accumulation section C14, the first FD section FD15a, and the second FD section FD15b is output to the vertical signal line 110 via the amplification transistor T16 and the selection transistor T17. The signal NL is a signal based on the potential of the coupled region of the charge accumulation section C14, the first FD section FD15a, and the second FD section FD15b in the reset state.

Note that, hereinafter, the signal NL will also be referred to as the low-sensitivity reset signal NL.

Next, at the time t38, the drive signals SEL, FDG, and FCG are turned off, and the selection transistor T17, the third transfer gate section T12c, and the second transfer gate section T12b are turned off. As a result, the unit pixel PX is brought into the non-selected state. Furthermore, the potential coupling among the charge accumulation section C14, the first FD section FD15a, and the second FD section FD15b is resolved.

Next, at time t39, the horizontal synchronization signal XHS is input, and the reading period of the pixel signal of the unit pixel PX ends.

The ADC group 105 performs AD conversion on pixel signals from such a pixel PX having a high dynamic range (HDR). In this case, when reading one pixel signal, the ADC group 105 sequentially performs AC conversion on the high-sensitivity reset signal NH2, the high-sensitivity reset signals NH1 and NL, the high-sensitivity data signals SH1 and SH2, the low-sensitivity data signal SL, and the low-sensitivity reset signal NL.

In order to implement HDR in each of such pixels, it is necessary to perform AD conversion on a reset signal and a data signal each time the conversion efficiency of the pixel (the capacitance of the FD section) or the sensitivity of the photoelectric conversion section (the area of the photoelectric conversion section) is changed. One time of AD conversion mainly includes a period until the potential of the FD section is stabilized (settling period) and a period for performing AD conversion on a pixel signal (conversion period). Therefore, in a case where a plurality of times of AD conversion is executed, the settling period and the AD conversion period are alternately repeated for each time of AD conversion. Therefore, in a pixel having HDR, the number of times of AD conversion of the ADC group 105 increases, the reading time increases, and the frame rate decreases.

Therefore, in the present technology, the plurality of SH sections 125 is provided between the pixel section 101 and the ADC group 105, and settling periods and AD conversion periods of a plurality of signals are simultaneously executed in parallel. Hereinafter, a more detailed configuration and operation of the SH sections 125 will be described.

(Configuration of SH Section 125)

Figure 6:
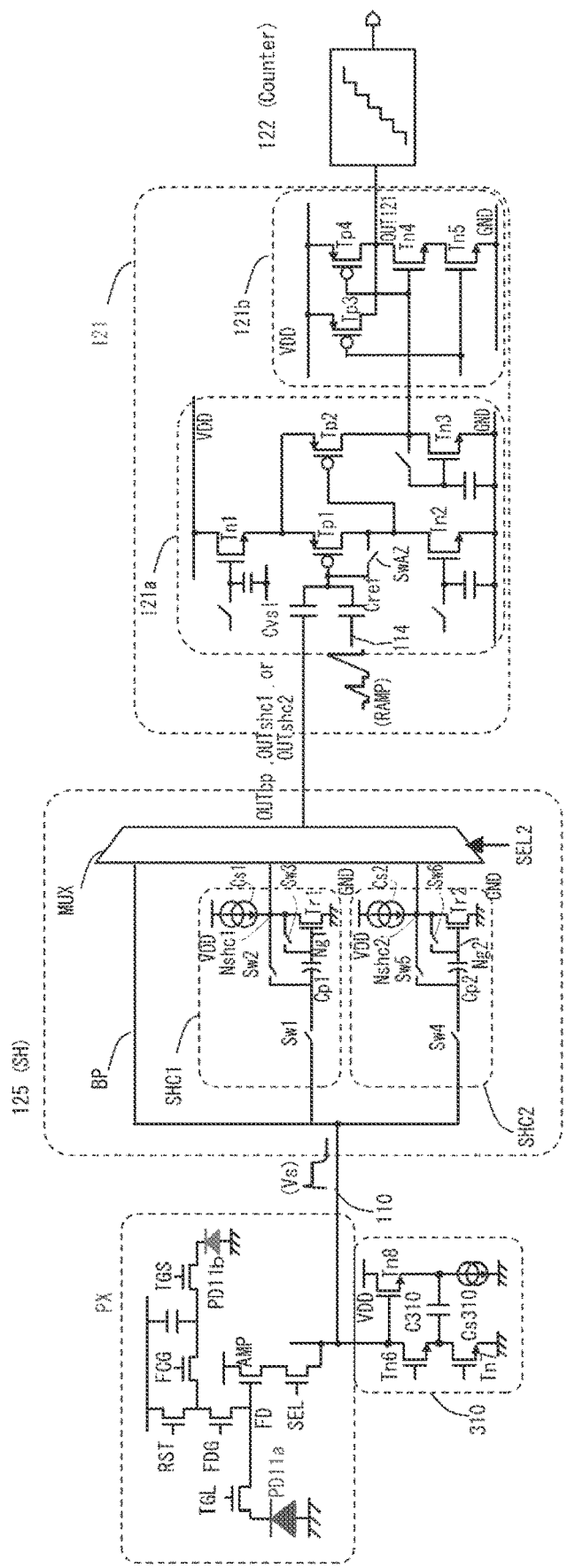
FIG. 6 is a circuit diagram illustrating a configuration example of a pixel, an SH section, and a comparator according to the first embodiment.

FIG. 6 is a circuit diagram illustrating a configuration example of the pixel PX, one SH section 125, and one comparator 121 according to the first embodiment. The pixel PX is as described above. Note that FIG. 6 illustrates one selected pixel PX in the pixel section 101. In addition, FIG. 6 illustrates configurations of the SH section 125 and the comparator 121 corresponding to one vertical signal line 110 for one column.

The SH section 125 includes a first holding circuit SHC1, a second holding circuit SHC2, a bypass signal line BP, and a multiplexer MUX. The input of the SH section 125 is connected to the pixel PX via the vertical signal line 110, and the output thereof is connected to the input of the comparator 121 in the ADC group 105.

(Configuration and Function of First Holding Circuit SHC1)

The first holding circuit SHC1 is provided between the pixel section 101 and the comparator 121, and is configured to sample and hold a pixel signal. The first holding circuit SHC1 includes a capacitor Cp1, a transistor Tr1, switches Sw1 to Sw3, and a constant current source Cs1.

One end of the capacitor Cp1 as a first capacitor is connected to the pixel PX via the switch Sw1, and the capacitor Cp1 can accumulate a pixel signal. The other end of the capacitor Cp1 is connected to the gate of the transistor Tr1.

The gate (node Ng1) of the transistor Tr1 as a first transistor is connected to the other end of the capacitor Cp1. The drain (node Nshc1) of the transistor Tr1 is connected to the constant current source Cs1 and the multiplexer MUX, and the source thereof is connected to a ground (reference voltage source) GND. The constant current source Cs1 is connected between a power supply VDD and the node Nshc1, and causes a constant current to flow to the drain of the transistor Tr1. The transistor Tr1 causes a current depending on the potential of the gate (node Ng1) to flow between the drain and the source. As a result, the drain (node Nshc1) of the transistor Tr1 has a potential corresponding to the potential of the gate (node Ng1) of the transistor Tr1. The node Nshc1 is connected to the multiplexer MUX, and the voltage of the node Nshc1 is output as an output signal OUTshc1 of the first holding circuit SHC1.

The switch Sw1 is connected between the capacitor Cp1 and the pixel PX. The switch Sw2 is connected between the drain (node Nshc1) of the transistor Tr1 and the one end of the capacitor Cp1. The switch Sw3 is connected between the drain (node Nshc1) of the transistor Tr1 and the other end of the capacitor Cp1.

When the first holding circuit SHC1 samples a pixel signal from the pixel PX to the capacitor Cp1, the switches Sw1 and Sw3 are turned on (conductive state). At this time, the switch Sw2 is turned off (non-conductive state). As a result, the pixel signal is transmitted to the one end of the capacitor Cp1, and accordingly, the capacitor node on the opposite side of the gate of the transistor Tr1 is set to a potential corresponding to the pixel signal. On the other hand, when the capacitor Cp1 holds the pixel signal, the switches Sw1 and Sw3 are turned off, and the switch Sw2 is turned on. As a result, the pixel signal accumulated in the capacitor Cp1 is held. At this time, the transistor Tr1 is brought into the conductive state (analog state) corresponding to the pixel signal, and the drain (node Nshc1) of the transistor Tr1 is maintained at the potential corresponding to the pixel signal. Therefore, the first holding circuit SHC1 outputs the output signal OUTshc1 corresponding to the pixel signal from the node Nshc1 to the multiplexer MUX.

(Configuration and Function of Second Holding Circuit SHC2)

Similarly to the first holding circuit SHC1, the second holding circuit SHC2 is provided between the pixel section 101 and the comparator 121, and is configured to sample and hold a pixel signal. The second holding circuit SHC2 includes a capacitor Cp2, a transistor Tr2, switches Sw4 to Sw6, and a constant current source Cs2. The second holding circuit SHC2 samples a pixel signal from the same pixel PX as that of the first holding circuit SHC1 at different timings. Therefore, the first and second holding circuits SHC1 and SHC2 can sample and hold a plurality of pixel signals having different sensitivities or conversion efficiencies from the same pixel PX.

One end of the capacitor Cp2 as a second capacitor is connected to the pixel PX via the switch Sw4, and the capacitor Cp2 can accumulate a pixel signal. The other end of the capacitor Cp2 is connected to the gate of the transistor Tr2.

The gate (node Ng2) of the transistor Tr2 as a second transistor is connected to the other end of the capacitor Cp2. The drain (node Nshc2) of the transistor Tr2 is connected to the constant current source Cs2 and the multiplexer MUX, and the source thereof is connected to a ground (reference voltage source) GND. The constant current source Cs2 is connected between a power supply VDD and the node Nshc2, and causes a constant current to flow to the drain of the transistor Tr2. The transistor Tr2 causes a current depending on the potential of the gate (node Ng2) to flow between the drain and the source. As a result, the drain (node Nshc2) of the transistor Tr2 has a potential corresponding to the potential of the gate (node Ng2) of the transistor Tr2. The node Nshc2 is connected to the multiplexer MUX, and the voltage of the node Nshc2 is output as an output signal OUTshc2 of the second holding circuit SHC2.

The switch Sw4 is connected between the capacitor Cp2 and the pixel PX. The switch Sw5 is connected between the drain (node Nshc2) of the transistor Tr2 and the one end of the capacitor Cp2. The switch Sw6 is connected between the drain (node Nshc2) of the transistor Tr2 and the other end of the capacitor Cp2.

When the second holding circuit SHC2 samples a pixel signal from the pixel PX to the capacitor Cp2, the switches Sw4 and Sw6 are turned on. At this time, the switch Sw5 is turned off. As a result, the pixel signal is transmitted to the one end of the capacitor Cp2, and accordingly, the capacitor node on the opposite side of the gate of the transistor Tr2 is set to a potential corresponding to the pixel signal. On the other hand, when the capacitor Cp2 holds the pixel signal, the switches Sw4 and Sw6 are turned off, and the switch Sw5 is turned on. As a result, the pixel signal accumulated in the capacitor Cp2 is held. At this time, the gate (node Ng2) of the transistor Tr2 is brought into the conductive state (analog state) corresponding to the pixel signal, and the drain (node Nshc2) of the transistor Tr2 is maintained at the potential corresponding to the pixel signal. Therefore, the second holding circuit SHC2 outputs the output signal OUTshc2 corresponding to the pixel signal from the node Nshc2 to the multiplexer MUX.

As described above, each of the first and second holding circuits SHC1 and SHC2 is configured as an active element. As a result, the first and second holding circuits SHC1 and SHC2 are resistant to fluctuations in the voltage of the ground GND and the power supply VDD, and can cancel characteristic variations of the transistors Tr1 and Tr2.

(Configuration and Function of Bypass Signal Line BP)

The bypass signal line BP is provided between the pixel PX and the comparator 121 of the ADC group 105, and transmits a pixel signal from the pixel PX as it is via the multiplexer MUX. The bypass signal line BP directly outputs an output signal OUTbp via the multiplexer MUX without holding the pixel signal by a capacitor or the like. Therefore, noise caused by the capacitors Cp1 and Cp2 and the transistors Tr1 and Tr2 is not mixed into the pixel signal. That is, the bypass signal line BP can be used in a case where a signal degradation component applied by the holding circuits SHC1 and SHC2 cannot be tolerated, for example, in a case where it is desired to minimize noise near a dark signal with high conversion efficiency.

(Multiplexer MUX)

The multiplexer MUX is connected between the first holding circuit SHC1, the second holding circuit SHC2, and the bypass signal line BP, and the comparator 121. The multiplexer MUX as a selection circuit can selectively connect any one of the first holding circuit SHC1, the second holding circuit SHC2, and the bypass signal line BP to the comparator 121 of the ADC group 105. As a result, the multiplexer MUX can selectively transmit, to the comparator 121, the pixel signal OUTshc1 held in the first holding circuit SHC1, the pixel signal OUTshc2 held in the second holding circuit SHC2, or the pixel signal OUTbp transmitted through the bypass signal line BP. The multiplexer MUX selects the holding circuit SHC1, the holding circuit SHC2, or the bypass signal line BP to be connected to the comparator 121 on the basis of a selection signal SEL2. The selection signal SEL2 is received from the vertical scanning circuit 103. The selection signal SEL2 is only required to be set to select one of the holding circuit SHC1, the holding circuit SHC2, or the bypass signal line BP according to the control signals TGL, TGS, FDG, FCG, and SEL of the pixel PX. The multiplexer MUX is only required to be configured by any switch circuit capable of executing the above operation.

(Configuration and Function of Comparator 121)

The comparator 121 includes an input comparison circuit 121a and an output circuit 121b.

The input comparison circuit 121a includes p-type transistors Tp1 and Tp2, n-type transistors Tn1 to Tn3, capacitors Cvs1 and Cref, and an AZ switch SwAZ.

One ends of the capacitors Cvs1 and Cref are connected to the output of the SH section 125 and the reference signal line 114, respectively. The other ends of the capacitors Cvs1 and Cref are commonly connected to the gate of the transistor Tp1.

The transistors Tn1, Tp1, and Tn2 are connected in series between a power supply VDD and a ground GND in this order.

The drain of the transistor Tn1 is connected to the power supply VDD, and the source thereof is connected to the source of the transistor Tp1. The transistor Tn1 functions as a low dropout (LDO) linear regulator.

As described above, the gate of the transistor Tp1 is commonly connected to the other ends of the capacitors Cvs1 and Cref. The source of the transistor Tp1 is connected to the source of the transistor Tn1, and the drain of the transistor Tp1 is connected to the drain of the transistor Tn2 and the gate of the transistor Tp2. When an addition signal of the output signal (any one of OUTbp, OUTshc1, and OUTshc2) from the multiplexer MUX of the SH section 125 and the reference signal RAMP from the DAC 104 exceeds a threshold voltage, the transistor Tp1 is changed from the conductive state to the non-conductive state, and the voltage level of the gate of the transistor Tp2 is inverted from the high level to the low level. That is, the transistor Tp1a functions as an amplifier that amplifies and detects the level of the output signal from the multiplexer MUX.

The gate of the transistor Tp2 is connected to the drain of the transistor Tp1. The source of the transistor Tp2 is connected to the source of the transistor Tn1 in common with the source of the transistor Tp1. The drain of the transistor Tp2 is connected to the drain of the transistor Tn2. When the transistor Tp1 is changed from the conductive state to the non-conductive state, the transistor Tp2 is conversely changed from the non-conductive state to the conductive state, and inverts the drain voltage of the transistor Tp2 from the low level to the high level.

The transistor Tn2 is connected between the drain of the transistor Tp1 and the ground GND, and functions as a constant current source for causing a constant current to flow through the transistor Tp1. The transistor Tn3 is connected between the drain of the transistor Tp2 and the ground GND, and functions as a constant current source for causing a constant current to flow through the transistor Tp2.

The AZ switch SwAZ is connected between the gate of the transistor Tp1 and the gate of the transistor Tp2, and performs an auto-zero operation by equalizing potentials between the gate and the drain of the transistor Tp1 before detecting the output signal of the SH section 125.

The output circuit 121b includes p-type transistors Tp3 and Tp4 and n-type transistors Tn4 and Tn5. The transistor Tp3 is connected between a power supply VDD and an output terminal OUT121 of the comparator 121. The transistor Tn5 is connected between the source of the transistor Tn4 and a ground GND. The gates of the transistors Tp3 and Tn5 are commonly connected. The transistors Tp3 and Tn5 have a role of fixing the output OUT121 to the high level in a period other than a count period. The transistors Tp4 and Tn4 are connected in series between the power supply VDD and the drain of the transistor Tn5. A node between the transistor Tp4 and the transistor Tn4 is the output terminal OUT121. The gates of the transistors Tp4 and Tn4 are commonly connected to the output of the input comparison circuit 121a (the drain of the transistor Tp2). The transistors Tp4 and Tn4 function as an inverter circuit.

When the drain voltage of the transistor Tp2 is inverted from the low level to the high level, the output terminal OUT121 of the comparator 121 is inverted from the high level to the low level by the transistors Tp4 and Tn4, conversely. Inversion of the voltage level of the output terminal OUT121 is used to stop the operation of the counter 122. This enables AD conversion.

(Configuration of Negative Capacitance Circuit 310)

A negative capacitance circuit 310 includes n-type transistors Tn6 to Tn8, a capacitor C310, and a constant current source Cs310. The gate of the transistor Tn8 is connected to the vertical signal line 110. The drain of the transistor Tn8 is connected to a power supply VDD, and the source thereof is connected to the constant current source Cs310. As a result, the transistor Tn8 and the constant current source Cs310 function as a source follower, and the gain thereof is smaller than "1".

One end of the capacitor C310 is connected to the gate of the transistor Tn8 via the transistor Tn6. The other end of the capacitor C310 is connected to the source of the transistor Tn8. As a result, the same polarity signal obtained by dividing the vertical signal line 110 by the gain of the transistor Tn6 is visible to the source of the transistor Tn6, and the signal obtained by multiplying the fluctuation in the vertical signal line 110 by the gain of the source follower is visible to the source side of the transistor Tn8. As a result, at both ends of the capacitor C310, it seems that a relatively large gain of the same polarity with respect to the source side of the transistor Tn6 is applied to the source side of the transistor Tn8. As a result, the circuit 310 operates as a negative capacitance circuit.

The transistor Tn7 is connected between the one end of the capacitor C310 and a ground GND. The transistor Tn6 is connected between the one end of the capacitor C310 and the vertical signal line 110. The transistor Tn7 functions as a constant current source of the vertical signal line 110.

A parasitic capacitance is generated in the vertical signal line 110. It is assumed that a voltage of +Vs is applied to the parasitic capacitance of the vertical signal line 110.

In this case, in the negative capacitance circuit 310, when the gain of the transistor Tn8 and the constant current source Cs310 functioning as the source follower is set to "0.9" and the gain from the source to the drain of the transistor Tn6 is set to "10", 0.1×Vs is applied to the terminal of the capacitor C310 on the side of the vertical signal line 110, and 0.9×Vs is applied to the terminal on the opposite side. Therefore, when the potential on the opposite side of the vertical signal line 110 (0.9×Vs) is set as a reference, a voltage of −0.8×Vs is applied to the capacitor C310. As a result, +Vs is applied to the parasitic capacitance of the vertical signal line 110, and −0.8×Vs is applied to the capacitor C310. Therefore, the wiring capacitance of the vertical signal line 110 decreases as compared with a case where the negative capacitance circuit 310 is not provided.

Note that, although the transistor Tn8 and the constant current source Cs310 that function as the source follower are used in the present disclosure, another configuration capable of non-inverting amplification may be used as long as the influence of the parasitic capacitance of the vertical signal line 110 can be sufficiently reduced.

(Operation of SH Section 125)

Figure 7:
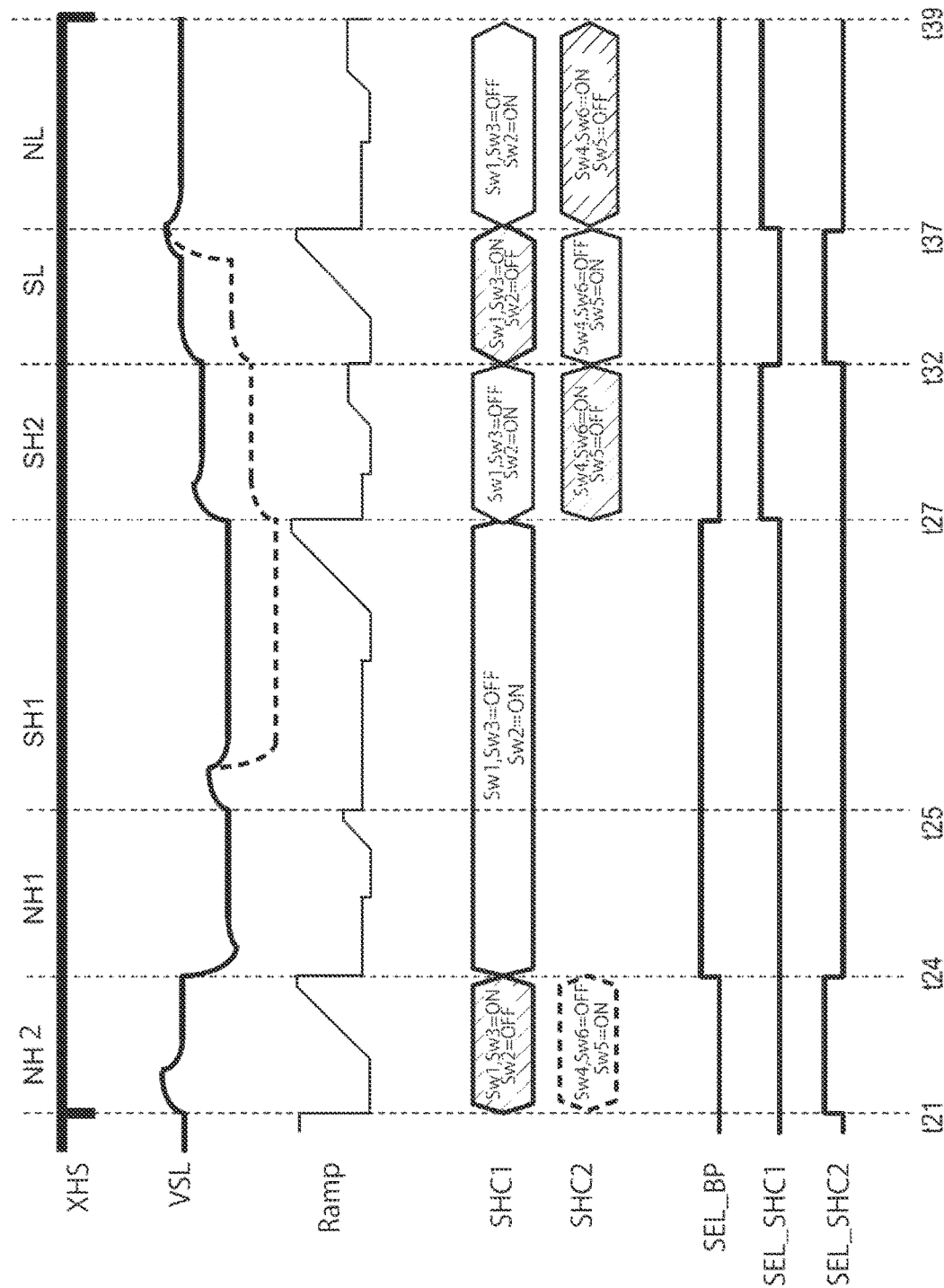
FIG. 7 is a timing chart illustrating an operation example of the SH section in an AD conversion operation.

FIG. 7 is a timing chart illustrating an operation example of the SH section 125 in an AD conversion operation. FIG. 7 illustrates the operation of the SH section 125 corresponding to the reading operation of the pixel PX in FIG. 5. Note that, in the upper part of FIG. 7, a voltage VSL of the vertical signal line 110 corresponding to the signals to be read (NH2, NH1, SH1, SH2, SL, and NL) and the reference signal RAMP are illustrated. SHC1 and SHC2 in FIG. 7 indicate states of the first and second holding circuits SHC1 and SHC2, respectively.

Selection signals SEL_BP, SEL_SHC1, and SEL_SHC2 are signals input to the multiplexer MUX as selection signals SEL2. The selection signals SEL_BP, SEL_SHC1, and SEL_SHC2 are control signals for selecting one of the bypass signal line BP, the first holding circuit SHC1, and the second holding circuit SHC2, and a plurality of the selection signals SEL_BP, SEL_SHC1, and SEL_SHC2 is not activated (does not rise) at the same time.

The selection signal SEL_BP is a signal for selecting the bypass signal line BP. When the selection signal SEL_BP rises, the multiplexer MUX outputs a pixel signal transmitted to the bypass signal line BP to the comparator 121. The selection signal SEL_SHC1 is a signal for selecting the first holding circuit SHC1. When the selection signal SEL_SHC1 rises, the multiplexer MUX outputs a pixel signal transmitted to the first holding circuit SHC1 to the comparator 121. When the selection signal SEL_SHC2 rises, the multiplexer MUX outputs a pixel signal transmitted to the second holding circuit SHC2 to the comparator 121.

The pixel PX, the SH section 125, and the comparator 121 read, as pixel signals, the high-sensitivity reset signal NH2, the high-sensitivity reset signal NH1, the high-sensitivity data signal SH1, the high-sensitivity data signal SH2, the low-sensitivity data signal SL, and the low-sensitivity reset signal NL in this order.

First, at the time t21, the horizontal synchronization signal XHS is input, and the reading period of the unit pixel PX is started. At this time, as described with reference to FIG. 5, the high-sensitivity reset signal NH2 based on the coupled potential of the first FD section FD15a and the second FD section FD15b is read from the pixel PX.

From t21 to t24, the switches Sw1 and Sw3 of the first holding circuit SHC1 are turned on, and the switch Sw2 is turned off. As a result, the first holding circuit SHC1 samples the high-sensitivity reset signal NH2. At this time, the first holding circuit SHC1 maintains the sampling state until the potentials of the first FD section FD15a and the second FD section FD15b are stabilized. Hereinafter, a period from when a pixel transistor is operated until the potential of an FD is stabilized will also be referred to as a settling period.

Note that, at t21, the pixel signal from the second holding circuit SHC2 in the previous reading period is output from the multiplexer MUX and subjected to AD conversion. Therefore, from t21 to t24, the selection signal SEL_SHC2 rises to the high level.

Next, at the time t24, the third transfer gate section T12c in FIG. 3 is turned off, and the first FD section FD15a and the second FD section FD15b are electrically disconnected. The high-sensitivity reset signal NH1 based on the potential of the first FD section FD15a is read from the pixel PX.

At this time, the selection signal SEL_SHC2 falls, and the selection signal SEL_BP rises. As a result, the bypass signal line BP is selectively connected to the comparator 121 from t24 to t25. The high-sensitivity reset signal NH1 is transmitted to the comparator 121 via the bypass signal line BP. The high-sensitivity reset signal NH1 is subjected to AD conversion in the ADC group 105.

Meanwhile, the switches Sw1 and Sw3 of the first holding circuit SHC1 are turned off, and the switch Sw2 is turned on. As a result, the first holding circuit SHC1 holds the sampled high-sensitivity reset signal NH2.

Next, at the time t25, the charge generated and accumulated in the first photoelectric conversion section PD11a during the exposure period is transferred to the first FD section FD15a. The high-sensitivity data signal SH1 is a pixel signal based on the potential of the first FD section FD15a in a state where the charge generated in the first photoelectric conversion section PD11a is accumulated. The high-sensitivity data signal SH1 based on the potential of the first FD section FD15a is read from the pixel PX. Therefore, as illustrated in FIG. 7, the voltage VSL of the vertical signal line 110 becomes a voltage corresponding to the light amount of incident light.

At this time, also from t25 to t27, the bypass signal line BP is selectively connected to the comparator 121. The high-sensitivity data signal SH1 is transmitted to the comparator 121 via the bypass signal line BP. The high-sensitivity data signal SH1 is subjected to AD conversion in the ADC group 105. Note that the first holding circuit SHC1 keeps holding the high-sensitivity reset signal NH2.

Next, at the time t27, the third transfer gate T12c in FIG. 3 is turned on again, and the first FD section FD15a and the second FD section FD15b are connected. As a result, the charge generated and accumulated in the first photoelectric conversion section PD11a during the exposure period is accumulated in the coupled capacitance of the first FD section FD15a and the second FD section FD15b. Therefore, the high-sensitivity data signal SH2 is a pixel signal based on the potential of the coupled capacitance of the first FD section FD15a and the second FD section FD15b when the charge generated in the first photoelectric conversion section PD11a is accumulated in the coupled capacitance. That is, the high-sensitivity data signal SH2 is read from the pixel PX.

At this time, the switches Sw4 and Sw6 of the second holding circuit SHC2 are turned on, and the switch Sw5 is turned off. As a result, the second holding circuit SHC2 samples the high-sensitivity data signal SH2. At this time, the second holding circuit SHC2 maintains the sampling state during the settling period until the potentials of the first FD section FD15a and the second FD section FD15b are stabilized.

Meanwhile, at t27, the selection signal SEL_BP falls, and the selection signal SEL_SHC1 rises. As a result, the multiplexer MUX disconnects the bypass signal line BP from the comparator 121, and selectively connects the first holding circuit SHC1 to the comparator 121. When the first holding circuit SHC1 is connected to the comparator 121, the high-sensitivity reset signal NH2 held in the first holding circuit SHC1 is transmitted to the comparator 121 via the multiplexer MUX. As a result, the high-sensitivity reset signal NH2 is subjected to AD conversion in the ADC group 105.

Next, as described with reference to t29 in FIG. 5, the potentials of the first FD section FD15a and the second FD section FD15b are reset to the power supply voltage VDD.

Next, at the time t32, the fourth transfer gate section T12d and the second transfer gate section T12b are further turned on while the third transfer gate section T12c in FIG. 3 is kept on. As a result, the charge generated in the second photoelectric conversion section PD11b during the exposure period is accumulated in the coupled capacitance of the charge accumulation section C14, the first FD section FD15a, and the second FD section FD15b. Therefore, the low-sensitivity data signal SL is a pixel signal based on the potential of the coupled capacitance of the charge accumulation section C14, the first FD section FD15a, and the second FD section FD15b when the charge generated in the second photoelectric conversion section PD11b is accumulated in the coupled capacitance. That is, the low-sensitivity data signal SL is read from the pixel PX.

At this time, the switches Sw1 and Sw3 of the first holding circuit SHC1 are turned on, and the switch Sw2 is turned off. As a result, the first holding circuit SHC1 samples the low-sensitivity data signal SL. In addition, the first holding circuit SHC1 maintains the sampling state during the settling period (t32 to t37) until the potentials of the charge accumulation section C14, the first FD section FD15a, and the second FD section FD15b are stabilized.

Meanwhile, the switches Sw4 and Sw6 of the second holding circuit SHC2 are turned off, and the switch Sw5 is turned on. As a result, the second holding circuit SHC2 holds, from t32 to t37, the high-sensitivity data signal SH2 sampled from t27 to t32.

Furthermore, at t32, the selection signal SEL_SHC1 falls, and the selection signal SEL_SHC2 rises. As a result, the multiplexer MUX disconnects the first holding circuit SH1 from the comparator 121, and selectively connects the second holding circuit SHC2 to the comparator 121. When the second holding circuit SHC2 is connected to the comparator 121, the high-sensitivity data signal SH2 held in the second holding circuit SHC2 is transmitted to the comparator 121 via the multiplexer MUX. As a result, the high-sensitivity data signal SH2 is subjected to AD conversion in the ADC group 105.

Next, as described with reference to t34 in FIG. 5, the potentials of the charge accumulation section C14, the first FD section FD15a, and the second FD section FD15b are reset to the power supply voltage VDD.

Next, at the time t37, the second transfer gate section T12b is turned on while the third transfer gate section T12c in FIG. 3 is kept on and the fourth transfer gate section T12d is kept off. As a result, the low-sensitivity reset signal NL based on the potential of the coupled capacitance of the charge accumulation section C14, the first FD section FD15a, and the second FD section FD15b in the reset state is read from the pixel PX.

At this time, the switches Sw4 and Sw6 of the second holding circuit SHC2 are turned on, and the switch Sw5 is turned off. As a result, the second holding circuit SHC2 samples the low-sensitivity reset signal NL.

Meanwhile, the switches Sw1 and Sw3 of the first holding circuit SHC1 are turned off, and the switch Sw2 is turned on. As a result, the first holding circuit SHC1 holds, from t37 to t39, the low-sensitivity data signal SL sampled from t32 to t37.

At t37, the selection signal SEL_SHC2 falls, and the selection signal SEL_SHC1 rises. As a result, the multiplexer MUX disconnects the second holding circuit SH2 from the comparator 121, and selectively connects the first holding circuit SHC1 to the comparator 121. When the first holding circuit SHC1 is connected to the comparator 121, the low-sensitivity data signal SL held in the first holding circuit SHC1 is transmitted to the comparator 121 via the multiplexer MUX. As a result, the low-sensitivity data signal SL is subjected to AD conversion in the ADC group 105.

Next, as described with reference to t39 in FIG. 5, the potentials of the charge accumulation section C14, the first FD section FD15a, and the second FD section FD15b are reset to the power supply voltage VDD.

At the time t39, the horizontal synchronization signal XHS is input, and the reading period of the pixel signal of the unit pixel PX ends.

Note that, the low-sensitivity reset signal NL sampled by the second holding circuit SHC2 from t37 to t39 is subjected to AD conversion in a reading period of the next unit pixel. For example, assuming that the broken-line frame indicated by t21 to t24 in FIG. 7 is the reading period of the next unit pixel, the switches Sw4 and Sw6 of the second holding circuit SHC2 are turned off and the switch Sw5 is turned on during the reading period of the next unit pixel. As a result, the second holding circuit SHC2 holds the low-sensitivity reset signal NL sampled immediately before. At this time, the second holding circuit SHC2 is connected to the comparator 121, and the low-sensitivity reset signal NL held in the second holding circuit SHC2 is transmitted to the comparator 121 via the multiplexer MUX. As a result, the low-sensitivity reset signal NL is subjected to AD conversion in the ADC group 105.

Thereafter, by repeating a similar cycle (one horizontal period), the ADC group 105 can perform AD conversion on pixel signals from the pixel section 101.

As described above, the solid-state imaging device 100 according to the present disclosure includes the SH sections 125 between the pixel section 101 and the ADC group 105. Each of the SH sections 125 includes the bypass signal line BP, the first holding circuit SHC1, the second holding circuit SHC2, and the multiplexer MUX. The multiplexer MUX selectively outputs any one of pixel signals output from the bypass signal line BP, the first holding circuit SHC1, and the second holding circuit SHC2 to the ADC group 105.

As illustrated in FIG. 7, during a period in which the multiplexer MUX outputs a first pixel signal held in the first holding circuit SHC1 to the ADC group 105, the second holding circuit SHC2 samples a second pixel signal as another signal and settles the second pixel signal. Conversely, during a period in which the multiplexer MUX outputs the second pixel signal held in the second holding circuit SHC2 to the ADC group 105, the first holding circuit SHC1 samples the first pixel signal as another signal and settles the first pixel signal. In this manner, the first and second holding circuits SHC1 and SHC2 alternately repeat sampling (and settling) and holding (and outputting) of the pixel signals. As a result, during a period in which one of the first and second holding circuits SHC1 and SHC2 holds (and outputs) a pixel signal, another pixel signal can be sampled (and settled) in parallel.

In a case where the SH section 125 is not provided, a plurality of pixel signals is sequentially processed in series. For example, the first pixel signal is subjected to AD change after the settling period elapses. After the AD conversion on the first pixel signal, the next second pixel signal is also subjected to AD change after the settling period elapses.

After the AD conversion on the second pixel signal, a next third pixel signal is also subjected to AD change after the settling period elapses. In this manner, the plurality of pixel signals is subjected to AD conversion while the settling period and the AD conversion period are sequentially repeated in series. Therefore, it takes a long time to perform AD conversion on a plurality of pixel signals from one pixel PX. In particular, the settling period is often longer than the AD conversion period, and thus, in a case where AD conversion is performed on a plurality of pixel signals in each pixel PX, the frame rate is prolonged.

On the other hand, in the present disclosure, during a period in which one of the first and second holding circuits SHC1 and SHC2 holds (and outputs) a pixel signal, the other can sample (and settle) another pixel signal in parallel. As a result, the AD conversion processing on the plurality of pixel signals can be executed simultaneously in parallel, and the frame rate can be shortened.

Furthermore, in the present disclosure, the bypass signal line BP is provided in addition to the first and second holding circuits SHC1 and SHC2. As a result, in a case where it is not preferable that noise of the first and second holding circuits SHC1 and SHC2 is mixed in a pixel signal, the multiplexer MUX is only required to select the bypass signal line BP and directly transmit the pixel signal to the ADC group 105 via the bypass signal line BP. As a result, the solid-state imaging device 100 can perform AD conversion on a reset signal and a data signal in a case where the reset signal and the data signal are sensitive to noise and high conversion efficiency is used, without affecting the reset signal and the data signal by noise of the first and second holding circuits SHC1 and SHC2.

Note that, in order to shorten the frame rate, the SH section 125 is only required to include the first and second holding circuits SHC1 and SHC2, and the bypass signal line BP is not essential. However, in order to obtain the noise suppression effect, it is preferable that the bypass signal line BP is provided.

Furthermore, in the present disclosure, the negative capacitance circuit 310 is connected to the vertical signal line 110. As a result, the parasitic capacitance of the vertical signal line 110 can be canceled, and the settling period of the potential of the vertical signal line 110 can be shortened.

Furthermore, the comparator 121 according to the present disclosure is only required to have a configuration capable of sequentially performing AD conversion on pixel signals one by one, and does not need to have a special and complicated configuration capable of simultaneously performing AD conversion of a plurality of pixel signals. That is, according to the present disclosure, although the pixel PX having HDR is used, the circuit scale of the ADC group 105 can be reduced by the SH section 125 being provided.

(First Modification)

Figure 8:
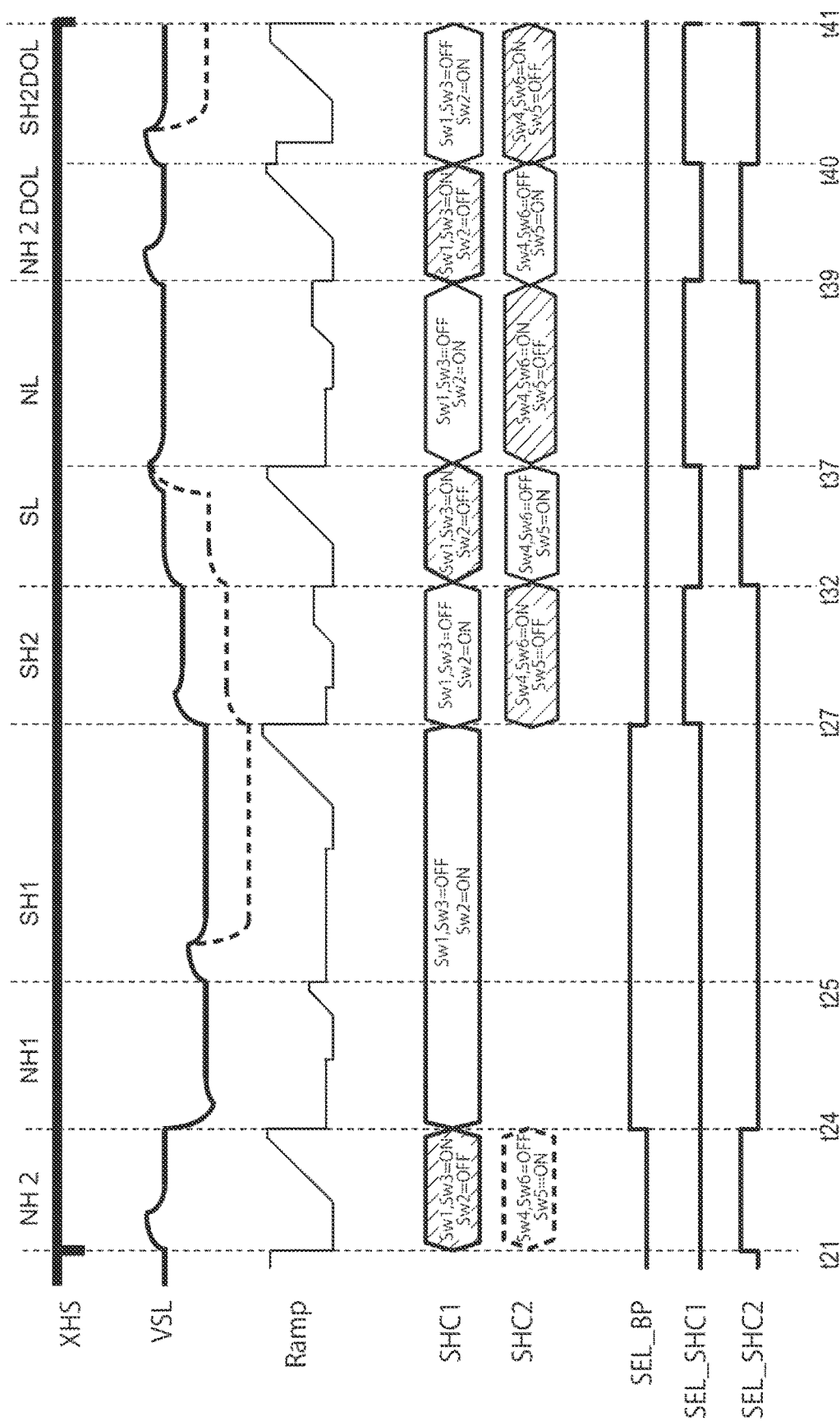
FIG. 8 is a timing chart illustrating an operation example of the SH section in an AD conversion operation according to a first modification.

FIG. 8 is a timing chart illustrating an operation example of the SH section 125 in an AD conversion operation according to a first modification. In the present modification, after the time t39, a short-time high-sensitivity reset signal NH2DOL and a short-time high-sensitivity data signal SH2DOL are read. The short-time high-sensitivity reset signal NH2DOL and the short-time high-sensitivity data signal SH2DOL are a high-sensitivity reset signal and a high-sensitivity data signal obtained by shortening the exposure time of the pixel PX, respectively. Shortening the exposure time makes it possible to suppress saturation of the first photoelectric conversion section PD11a and further expand the dynamic range.

The operations from t21 to t39 may be the same as those in the first embodiment.

Thereafter, the coupled capacitance of the first FD section FD15a and the second FD section FD15b in FIG. 3 is reset. At the time t39, the pixel PX in FIG. 3 is brought into the same state as that at the time of reading the high-sensitivity reset signal NH2. The short-time high-sensitivity reset signal NH2DOL based on the coupled potential of the first FD section FD15a and the second FD section FD15b is read from the pixel PX.

From t39 to t40, the switches Sw1 and Sw3 of the first holding circuit SHC1 are turned on, and the switch Sw2 is turned off. As a result, the first holding circuit SHC1 samples the short-time high-sensitivity reset signal NH2DOL. At this time, the first holding circuit SHC1 maintains the sampling state until the potentials of the first FD section FD15a and the second FD section FD15b are stabilized.

Meanwhile, the switches Sw4 and Sw6 of the second holding circuit SHC2 are turned off, and the switch Sw5 is turned on. As a result, the second holding circuit SHC2 holds the low-sensitivity reset signal NL sampled from t37 to t39.

At this time, the selection signal SEL_SHC1 falls, and the selection signal SEL_SHC2 rises. As a result, the multiplexer MUX disconnects the first holding circuit SHC1 from the comparator 121, and selectively connects the second holding circuit SHC2 to the comparator 121. When the second holding circuit SHC2 is connected to the comparator 121, the low-sensitivity reset signal NL held in the second holding circuit SHC2 is transmitted to the comparator 121 via the multiplexer MUX. As a result, the low-sensitivity reset signal NL is subjected to AD conversion in the ADC group 105.

Next, at the time t40, the pixel PX in FIG. 3 is brought into the same state as that at the time of reading the high-sensitivity data signal SH2. As a result, the charge generated and accumulated in the first photoelectric conversion section PD11a during the exposure period is accumulated in the coupled capacitance of the first FD section FD15a and the second FD section FD15b. This exposure period is shorter than the exposure period of the high-sensitivity data signal SH2. At the same time, the short-time high-sensitivity data signal SH2DOL based on the potentials of the first FD section FD15a and the second FD section FD15b is read from the pixel PX.

At this time, the switches Sw4 and Sw6 of the second holding circuit SHC2 are turned on, and the switch Sw5 is turned off. As a result, the second holding circuit SHC2 samples the short-time high-sensitivity data signal SH2DOL. At this time, the second holding circuit SHC2 maintains the sampling state during the settling period until the potentials of the first FD section FD15a and the second FD section FD15b are stabilized.

Meanwhile, at t40, the selection signal SEL_SHC2 falls, and the selection signal SEL_SHC1 rises. As a result, the multiplexer MUX disconnects the second holding circuit SHC2 from the comparator 121, and selectively connects the first holding circuit SHC1 to the comparator 121. When the first holding circuit SHC1 is connected to the comparator 121, the short-time high-sensitivity reset signal NH2DOL held in the first holding circuit SHC1 is transmitted to the comparator 121 via the multiplexer MUX. As a result, the short-time high-sensitivity reset signal NH2DOL is subjected to AD conversion in the ADC group 105.

Note that, the short-time high-sensitivity data signal SH2DOL sampled by the second holding circuit SHC2 from t40 to t41 is subjected to AD conversion in a reading period of the next unit pixel. For example, as illustrated in t21 to t24 in FIG. 8, in the reading period of the next unit pixel, the switches Sw4 and Sw6 of the second holding circuit SHC2 are turned off, and the switch Sw5 is turned on. As a result, the second holding circuit SHC2 holds the short-time high-sensitivity data signal SH2DOL sampled immediately before. At this time, the second holding circuit SHC2 is connected to the comparator 121, and the short-time high-sensitivity data signal SH2DOL held in the second holding circuit SHC2 is transmitted to the comparator 121 via the multiplexer MUX. As a result, the short-time high-sensitivity data signal SH2DOL is subjected to AD conversion in the ADC group 105.

As described above, AD conversion is performed on a plurality of pixel signals in which not only the sensitivity and conversion efficiency of the pixel PX but also the exposure time is changed, so that the dynamic range of the pixel PX can be further expanded.

The configurations and other operations of the present modification may be the same as those of the first embodiment. Therefore, the present modification can obtain effects similar to those of the first embodiment.

(Second Modification)

Figure 9:
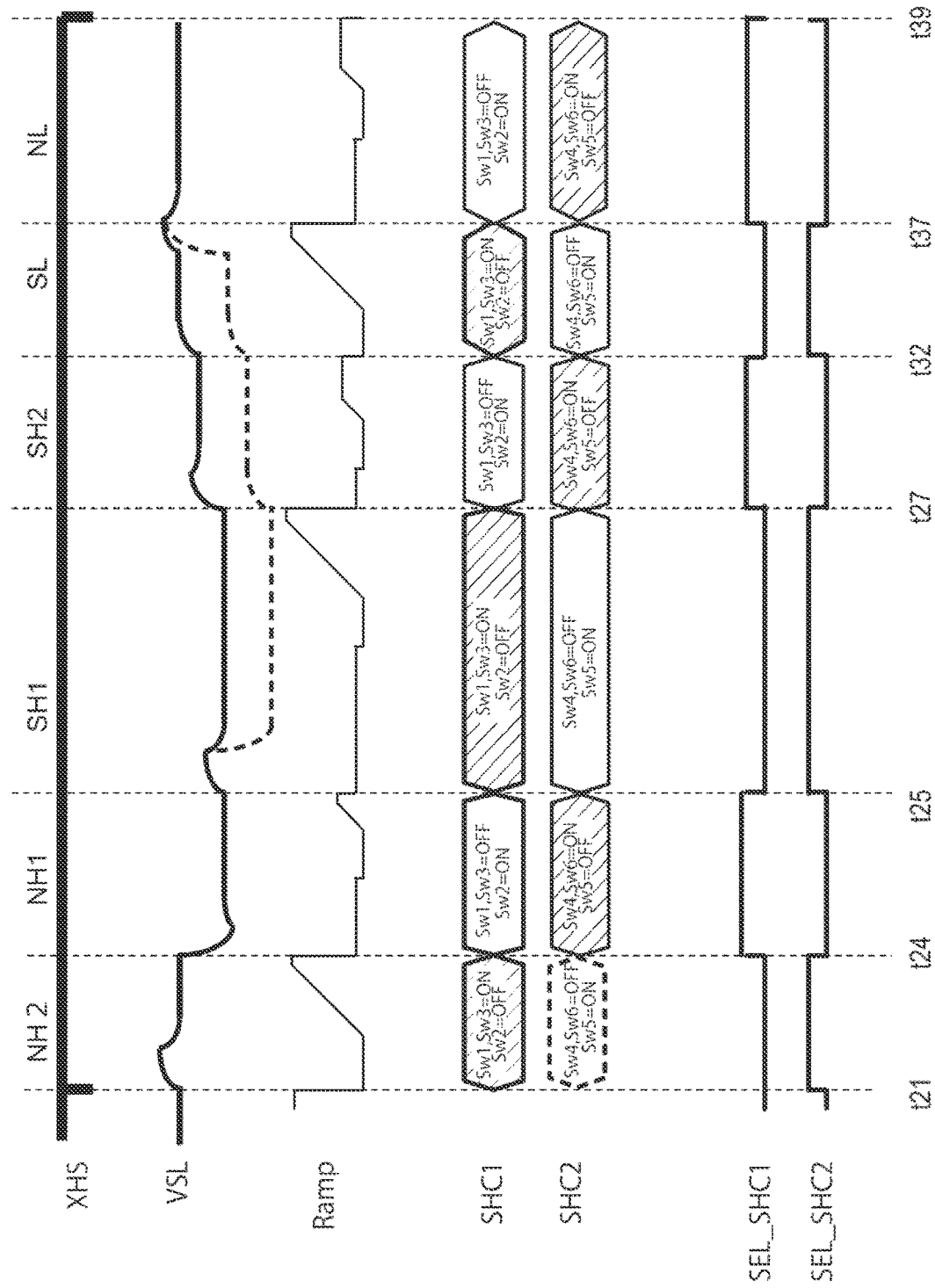
FIG. 9 is a timing chart illustrating an operation example of the SH section in an AD conversion operation according to a second modification.

FIG. 9 is a timing chart illustrating an operation example of the SH section 125 in an AD conversion operation according to a second modification. In the second modification, the bypass signal line BP is omitted, the first and second holding circuits SHC1 and SHC2 operate complementarily, and pixel signals are alternately sampled and held repeatedly. That is, during a period in which one of the first and second holding circuits SHC1 and SHC2 holds (and outputs) a pixel signal, the other can sample (and settle) another pixel signal in parallel. As a result, the AD conversion processing on the plurality of pixel signals can be executed simultaneously in parallel, and the frame rate can be shortened.

The configurations and other operations of the second modification are similar to those of the first embodiment. Thus, the second modification can also obtain effects similar to those of the first embodiment. Furthermore, the second modification may be combined with the first modification.

Second Embodiment

Figure 10:
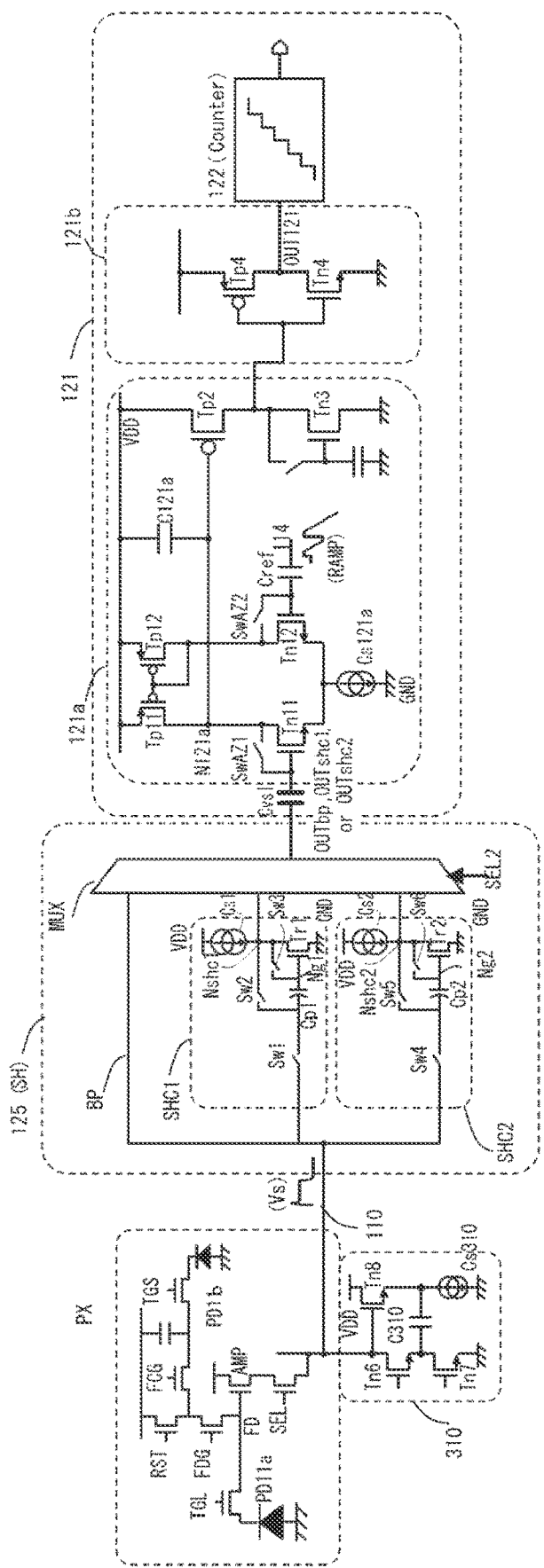
FIG. 10 is a circuit diagram illustrating a configuration example of a pixel, an SH section, and a comparator according to a second embodiment.

FIG. 10 is a circuit diagram illustrating a configuration example of a pixel PX, an SH section 125, and a comparator 121 according to a second embodiment. In the second embodiment, the configuration of the comparator 121 is different from that of the first embodiment. The other configurations of the second embodiment may be similar to those of the first embodiment.

In the second embodiment, an input comparison circuit 121a includes p-type transistors Tp2, Tp11, and Tp12, n-type transistors Tn3, Tn11, and Tn12, capacitors Cvs1 and Cref, AZ switches SwAZ1 and SwAZ2, and a constant current source Cs121a.

One ends of the capacitors Cvs1 and Cref are connected to the output of the SH section 125 and a reference signal line 114, respectively. The other ends of the capacitors Cvs1 and Cref are connected to the gates of the transistors Tn11 and Tn12, respectively.

The transistors Tn11, Tn12, Tp11, and Tp12 and the constant current source Cs121a constitute a differential circuit, and output a voltage difference between a pixel signal (OUTbp, OUTshc1, or OUTshc2) from the SH section 125 and a reference signal RAMP. The transistors Tp11 and Tp12 constitute a current mirror circuit, and cause currents corresponding to a predetermined mirror ratio to flow through the transistors Tn11 and Tn12, respectively. The transistors Tn11 and Tn12 receives the pixel signal and the reference signal at the gates respectively, and output the voltage difference from a node N121a. The constant current source Cs121a maintains the entire current flowing through the transistors Tn11 and Tn12 at a predetermined value.

The AZ switch SwAZ1 is connected between the gate and the drain of the transistor Tn11, and performs an auto-zero operation by equalizing the potentials between the gate and the drain of the transistor Tn11 before detecting the output signal of the SH section 125.

The AZ switch SwAZ2 is connected between the gate and the drain of the transistor Tn12, and performs an auto-zero operation by equalizing the potentials between the gate and the drain of the transistor Tn12 before detecting the output signal of the SH section 125.

The transistor Tp2 functions as an amplifier that receives the voltage difference from the node N121a at the gate, amplifies the voltage difference, and outputs the voltage difference to an output circuit 121b. The transistor Tn3 functions as a constant current source that determines a current flowing through the transistor Tp2. A capacitor C121a is connected between a power supply VDD and the node N121a, and suppresses noise by reducing the operation band of the comparator 121.

The output circuit 121b includes a p-type transistor Tp4 and an n-type transistor Tn4. The transistors Tp4 and Tn4 function as an inverter circuit, invert the output voltage level from the input comparison circuit 121a, and output the inverted output voltage level from an output terminal OUT121 of the comparator 121. As described above, a general differential amplifier circuit may be used for the configuration of the comparator 121.

The other configurations and operations of the second embodiment may be similar to those of the first embodiment. Therefore, the second embodiment can obtain effects similar to those of the first embodiment.

Third Embodiment

Figure 11:
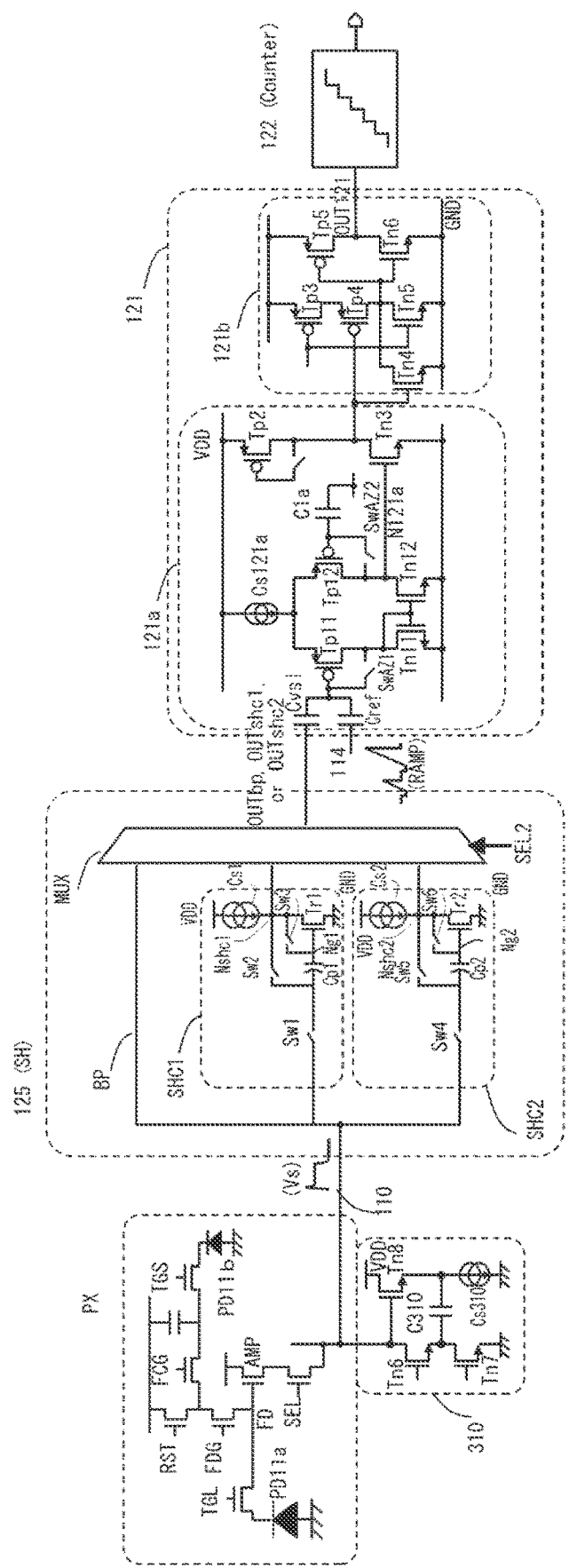
FIG. 11 is a circuit diagram illustrating a configuration example of a pixel, an SH section, and a comparator according to a third embodiment.

FIG. 11 is a circuit diagram illustrating a configuration example of a pixel PX, an SH section 125, and a comparator 121 according to a third embodiment. In the third embodiment, the configuration of the comparator 121 is different from that of the first embodiment. The other configurations of the third embodiment may be similar to those of the first embodiment.

A comparator 121a includes p-type transistors Tp2, Tp11, and Tp12, n-type transistors Tn3, Tn11, and Tn12, capacitors Cvs1, Cref, and C1a, AZ switches SwAZ1 and SwAZ2, and a constant current source Cs121a.

One ends of the capacitors Cvs1 and Cref are connected to the output of the SH section 125 and a reference signal line 114, respectively. The other ends of the capacitors Cvs1 and Cref are commonly connected to the gate of the transistor Tp11. The transistor Tp11 is switched between the conductive state and the non-conductive state when the voltage level of an addition signal of a pixel signal VSL and a reference signal RAMP exceeds a reference voltage.

The transistors Tn11, Tn12, Tp11, and Tp12 and the constant current source Cs121a constitute a differential circuit. When the transistor Tp11 is switched between the conductive state and the non-conductive state, the transistor Tp12 causes a predetermined current to flow similarly to the transistor Tp11, so that the voltage level of a node N121a between the transistor Tp12 and the transistor Tn12 is inverted. That is, the comparator 121a inverts the voltage level of the node N121a when the voltage level of the addition signal of the pixel signal and the reference signal exceeds the reference voltage. The transistors Tn11 and Tn12 constitute a current mirror circuit, and cause currents corresponding to a predetermined mirror ratio to flow through the transistors Tp11 and Tp12, respectively. The constant current source Cs121a maintains the entire current flowing through the transistors Tp11 and Tp12 at a predetermined value.

The capacitor C1a is connected between the gate of the transistor Tp12 and a predetermined voltage source, and sets the gate voltage of the transistor Tp12 to an auto-zero potential.

The AZ switch SwAZ1 is connected between the gate and the drain of the transistor Tp11, and performs an auto-zero operation by equalizing the potentials between the gate and the drain of the transistor Tp11 before detecting the output signal of the SH section 125.

The AZ switch SwAZ2 is connected between the gate and the drain of the transistor Tp12, and performs an auto-zero operation by equalizing the potentials between the gate and the drain of the transistor Tp12 before detecting the output signal of the SH section 125.

The transistor Tn3 functions as an amplifier that receives the potential of the node N121a at the gate, amplifies the voltage level thereof, and outputs the amplified voltage level to an output circuit 121b. The transistor Tp2 functions as a constant current source that determines a current flowing through the transistor Tn3.

The output circuit 121b includes p-type transistors Tp3 to Tp5 and n-type transistors Tn4 to Tn6. The transistors Tp4 and Tn4 function as an inverter circuit, and the transistors Tp5 and Tn6 also function as an inverter circuit. The gates of the transistors Tp3 and Tn5 are commonly connected and are at the low level at the time of counting, but an output terminal OUT121 is fixed to the high level at the time of non-counting. As a result, the output circuit 121b inverts the output signal from the input comparison circuit 121a twice by the two inverter circuits and outputs the inverted signal.

When the voltage level of the output of the input comparison circuit 121a is inverted, the voltage level of the output terminal OUT121 of the comparator 121 is inverted via the transistors Tp4 and Tn4 and the transistors Tp5 and Tn6. Inversion of the output terminal OUT121 is used to stop the operation of a counter 122. This enables AD conversion.

The other configurations and operations of the third embodiment may be similar to those of the first embodiment. Therefore, the third embodiment can obtain effects similar to those of the first embodiment.

Fourth Embodiment

Figure 12:
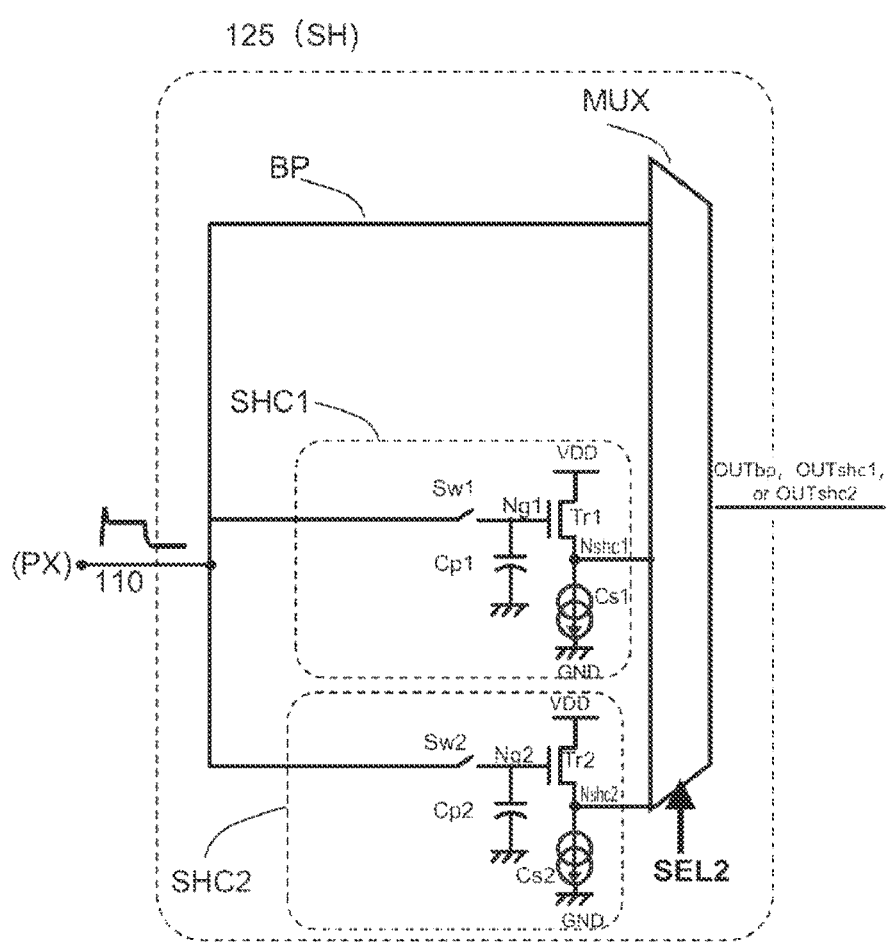
FIG. 12 is a circuit diagram illustrating a configuration example of an SH section according to a fourth embodiment.

FIG. 12 is a circuit diagram illustrating a configuration example of an SH section 125 according to a fourth embodiment. The fourth embodiment is different from the other embodiments in the configuration of the SH section 125. The configurations of the fourth embodiment other than the SH section 125 may be similar to those of the other embodiments. Therefore, in FIG. 12, only the configuration of the SH section 125 is illustrated, and illustration of the other configurations is omitted.

(Configuration and Function of First Holding Circuit SHC1)

A first holding circuit SHC1 includes a capacitor Cp1, a transistor Tr1, a switch Sw1, and a constant current source Cs1.

One end of the capacitor Cp1 is connected to a pixel PX via the switch Sw1, and the capacitor Cp1 can accumulate a pixel signal. Furthermore, the one end of the capacitor Cp1 is connected to the gate of the transistor Tr1. The other end of the capacitor Cp1 is connected to a ground GND.

The gate of the transistor Tr1 is connected to the one end of the capacitor Cp1. The drain of the transistor Tr1 is connected to a power supply VDD, and the source (node Nshc1) thereof is connected to the constant current source Cs1 and a multiplexer MUX. The constant current source Cs1 is connected between the source (node Nshc1) of the transistor Tr1 and a ground GND, and causes a constant current to flow through the transistor Tr1. The transistor Tr1 causes a current depending on the potential of the gate (node Ng1) to flow between the drain and the source. As a result, the source (node Nshc1) of the transistor Tr1 has a potential corresponding to the potential of the gate (node Ng1) of the transistor Tr1. The node Nshc1 is connected to the multiplexer MUX, and the voltage of the node Nshc1 is output as an output signal OUTshc1 of the first holding circuit SHC1. The transistor Tr1 functions as a source follower circuit.

The switch Sw1 is connected between the one end (node Ng1) of the capacitor Cp1 and the pixel PX. When the first holding circuit SHC1 samples the pixel signal from the pixel PX to the capacitor Cp1, the switch Sw1 is turned on. As a result, the pixel signal is accumulated in the capacitor Cp1, and accordingly, the gate (node Ng1) of the transistor Tr1 is set to a potential corresponding to the pixel signal. On the other hand, when the capacitor Cp1 holds the pixel signal, the switch Sw1 is turned off. As a result, the pixel signal is accumulated and held in the capacitor Cp1. At this time, the transistor Tr1 is brought into the conductive state corresponding to the pixel signal, and the drain (node Nshc1) of the transistor Tr1 is maintained at the potential corresponding to the pixel signal. Therefore, the first holding circuit SHC1 outputs the output signal OUTshc1 corresponding to the pixel signal from the node Nshc1 to the multiplexer MUX.

(Configuration and Function of Second Holding Circuit SHC2)

The configuration of a second holding circuit SHC2 may be the same as the configuration of the first holding circuit SHC1. The description of the first holding circuit SHC1 of the fourth embodiment is only required to replace the capacitor Cp1 with a capacitor Cp2, the transistor Tr1 with a transistor Tr2, the switch Sw1 with a switch Sw2, the constant current source Cs1 with a constant current source Cs2, the node Ng1 with a node Ng2, and the node Nshc1 with a node Nshc2.

When the second holding circuit SHC2 samples a pixel signal from the pixel PX to the capacitor Cp2, the switch Sw2 is turned on. As a result, the pixel signal is accumulated in the capacitor Cp2, and accordingly, the gate (node Ng2) of the transistor Tr2 is set to a potential corresponding to the pixel signal. On the other hand, when the capacitor Cp2 holds the pixel signal, the switch Sw2 is turned off. As a result, the pixel signal is accumulated and held in the capacitor Cp2. At this time, the transistor Tr2 is brought into the conductive state corresponding to the pixel signal, and the drain (node Nshc2) of the transistor Tr2 is maintained at the potential corresponding to the pixel signal. Therefore, the second holding circuit SHC2 outputs an output signal OUTshc2 corresponding to the pixel signal from the node Nshc2 to the multiplexer MUX. The capacitors Cp1 and Cp2 sample and hold pixel signals at different timings.

As described above, the first and second holding circuits SHC1 and SHC2 can execute the operation of the present disclosure even if the first and second holding circuits SHC1 and SHC2 are configured by passive elements. As a result, the circuit scale and the layout area of the SH section 125 can be reduced.

Fifth Embodiment

Figure 13:
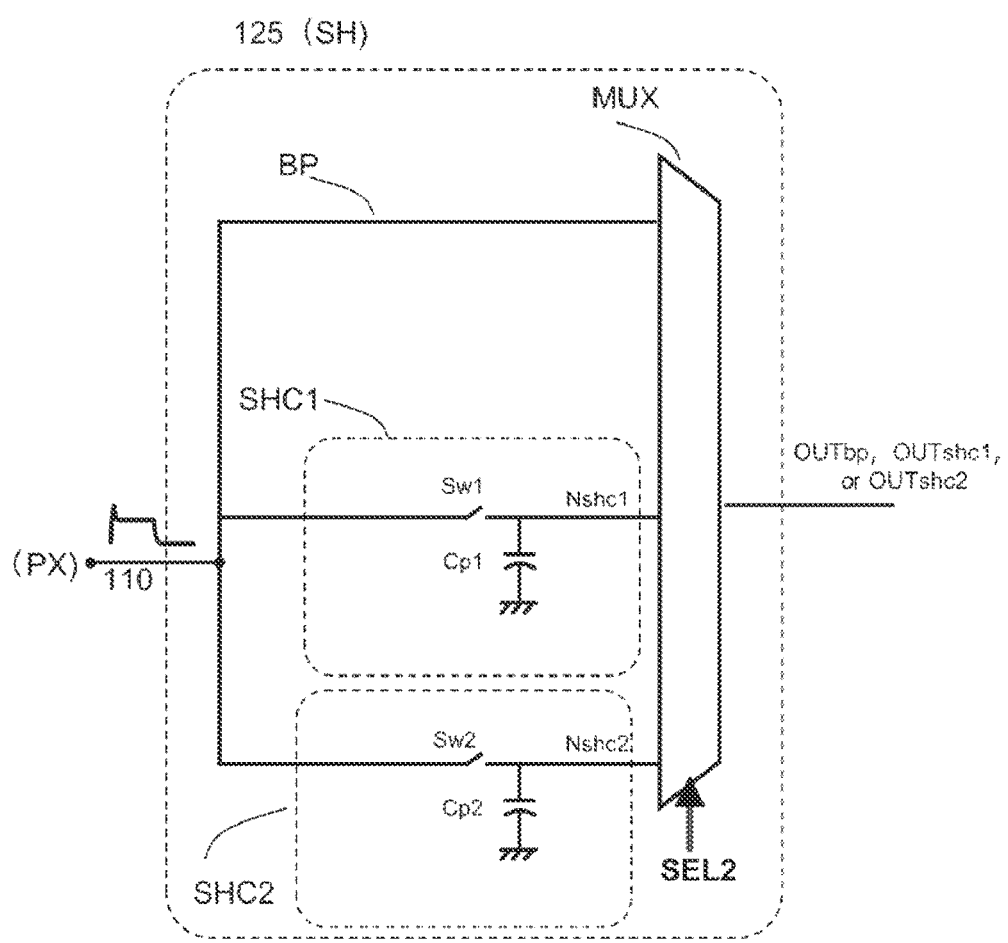
FIG. 13 is a circuit diagram illustrating a configuration example of an SH section according to a fifth embodiment.

FIG. 13 is a circuit diagram illustrating a configuration example of an SH section 125 according to a fifth embodiment. The fifth embodiment is different from the other embodiments in the configuration of the SH section 125. The configurations of the fifth embodiment other than the SH section 125 may be similar to those of the other embodiments. Therefore, in FIG. 13, only the configuration of the SH section 125 is illustrated, and illustration of the other configurations is omitted.

(Configuration and Function of First Holding Circuit SHC1)

A first holding circuit SHC1 includes a capacitor Cp1 and a switch Sw1. One end of the capacitor Cp1 is connected to a pixel PX via the switch Sw1, and the capacitor Cp1 can accumulate a pixel signal. Furthermore, the one end of the capacitor Cp1 as a node Nshc1 is connected to a multiplexer MUX. The other end of the capacitor Cp1 is connected to a ground GND.

The switch Sw1 is connected between the node Nshc1 and the pixel PX. When the first holding circuit SHC1 samples the pixel signal from the pixel PX to the capacitor Cp1, the switch Sw1 is turned on. As a result, the pixel signal is accumulated in the capacitor Cp1, and accordingly, the node Nshc1 is set to the potential of the pixel signal. On the other hand, when the capacitor Cp1 holds the pixel signal, the switch Sw1 is turned off. As a result, the pixel signal is accumulated and held in the capacitor Cp1. At this time, the node Nshc1 is maintained at a potential corresponding to the pixel signal. Therefore, the first holding circuit SHC1 outputs an output signal OUTshc1 corresponding to the pixel signal from the node Nshc1 to the multiplexer MUX.

(Configuration and Function of Second Holding Circuit SHC2)

The configuration of a second holding circuit SHC2 may be the same as the configuration of the first holding circuit SHC1. The description of the first holding circuit SHC1 of the fifth embodiment is only required to replace the capacitor Cp1 with a capacitor Cp2, the switch Sw1 with a switch Sw2, and the node Nshc1 with a node Nshc2.

When the second holding circuit SHC2 samples a pixel signal from the pixel PX to the capacitor Cp2, the switch Sw2 is turned on. As a result, the pixel signal is accumulated in the capacitor Cp2, and accordingly, the node Nshc2 is set to the potential of the pixel signal. On the other hand, when the capacitor Cp2 holds the pixel signal, the switch Sw2 is turned off. As a result, the pixel signal is accumulated and held in the capacitor Cp2. At this time, the node Nshc2 is maintained at a potential corresponding to the pixel signal. Therefore, the second holding circuit SHC2 outputs an output signal OUTshc2 corresponding to the pixel signal from the node Nshc2 to the multiplexer MUX.

As described above, the first and second holding circuits SHC1 and SHC2 may be configured by passive elements, and the source follower circuit may be omitted. As a result, the circuit scale and the layout area of the SH section 125 can be further reduced.

Sixth Embodiment

Figure 14:
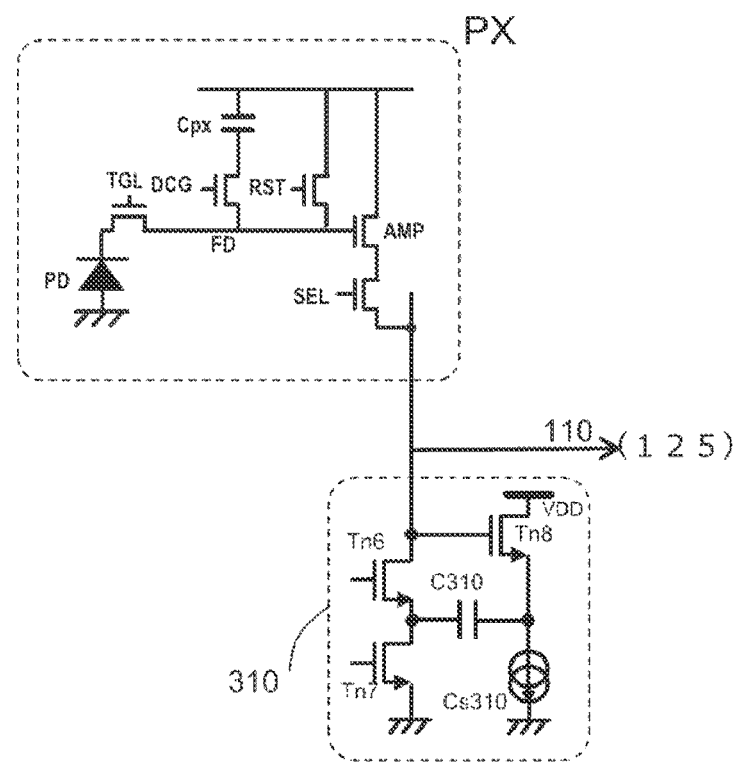
FIG. 14 is a circuit diagram illustrating a configuration example of an SH section according to a sixth embodiment.

FIG. 14 is a circuit diagram illustrating a configuration example of a pixel PX according to a sixth embodiment. The sixth embodiment is different from the other embodiments in the configuration of the pixel PX. The configurations of the sixth embodiment other than the pixel PX may be similar to those of the other embodiments. Therefore, in FIG. 14, only the configuration of the pixel PX is illustrated, and illustration of the other configurations is omitted.

In the sixth embodiment, each pixel PX includes only one photoelectric conversion section PD, and the sensitivity is constant. However, the pixel PX includes a capacitor Cpx, and the capacitance of a floating diffusion FD can be changed. As a result, the pixel PX can change the conversion efficiency for a pixel signal. Furthermore, the exposure time of the pixel PX can be changed.

Therefore, in the pixel PX of the sixth embodiment, the low-sensitivity data signal SL and the low-sensitivity reset signal NL in FIG. 8 cannot be obtained. However, the high-sensitivity reset signals NH1 and NH2, the high-sensitivity data signals SH1 and SH2, the short-time high-sensitivity reset signal NH2DOL, and the short-time high-sensitivity data signal SH2DOL as other signals can be obtained. As a result, the dynamic range can be expanded even in the pixel PX of the sixth embodiment.

(Application Example to Moving Body)

The technology according to the present disclosure (present technology) can be applied to various products. For example, the technology according to the present disclosure may be implemented as a device mounted on any type of moving body such as an automobile, an electric vehicle, a hybrid electric vehicle, a motorcycle, a bicycle, a personal mobility, an airplane, a drone, a ship, a robot, and the like.

Figure 15:
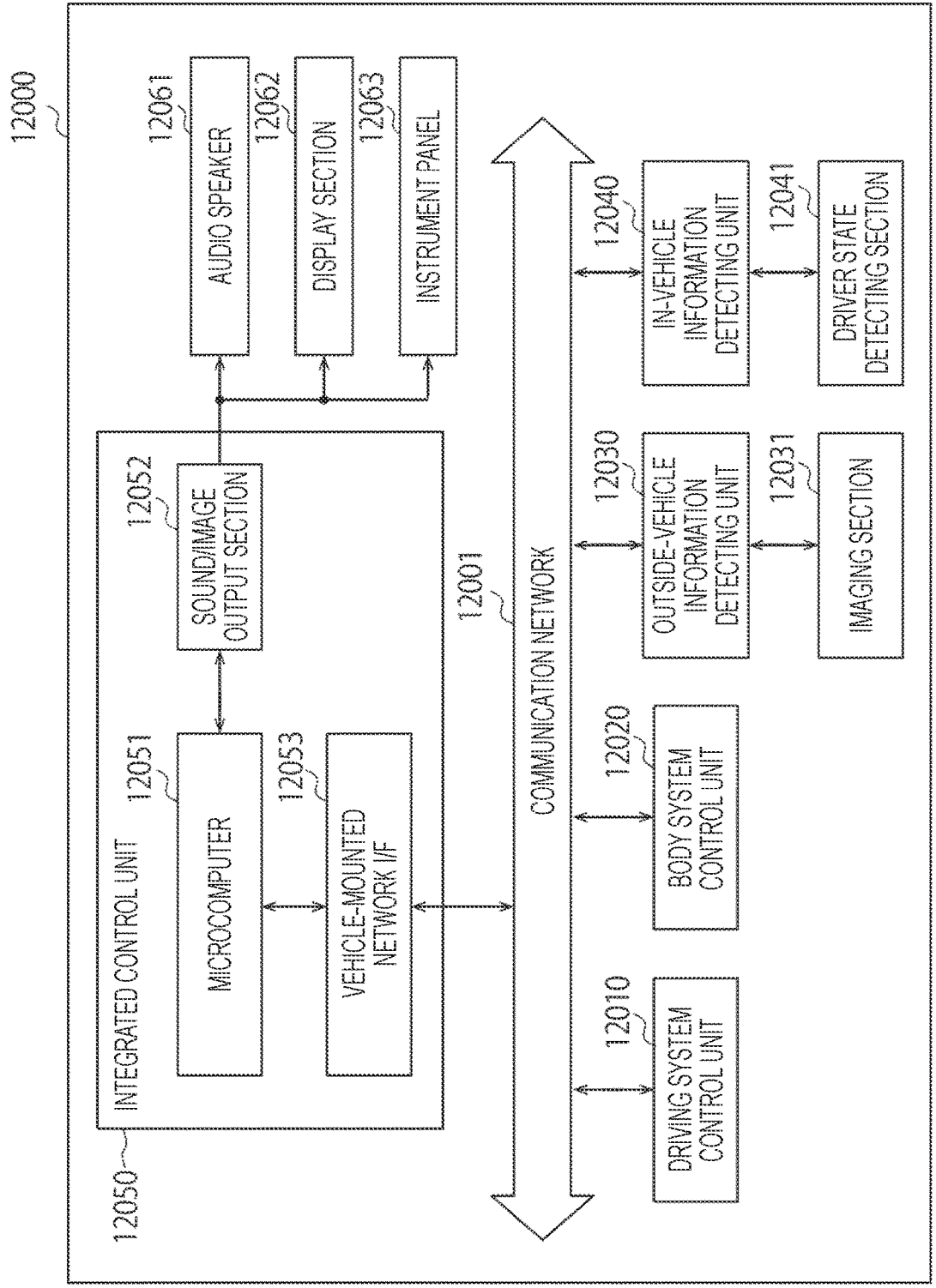
FIG. 15 is a block diagram illustrating a schematic configuration example of a vehicle control system as an example of a moving body control system to which the technology according to the present disclosure can be applied.

FIG. 15 is a block diagram illustrating a schematic configuration example of a vehicle control system as an example of a moving body control system to which the technology according to the present disclosure can be applied.

The vehicle control system 12000 includes a plurality of electronic control units connected to each other via a communication network 12001. In the example depicted in FIG. 15, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12030 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 15, an audio speaker 12061, a display section 12062, and an instrument panel 12063 are illustrated as output devices. The display section 12062 may, for example, include at least one of an on-board display and a head-up display.

Figure 16:
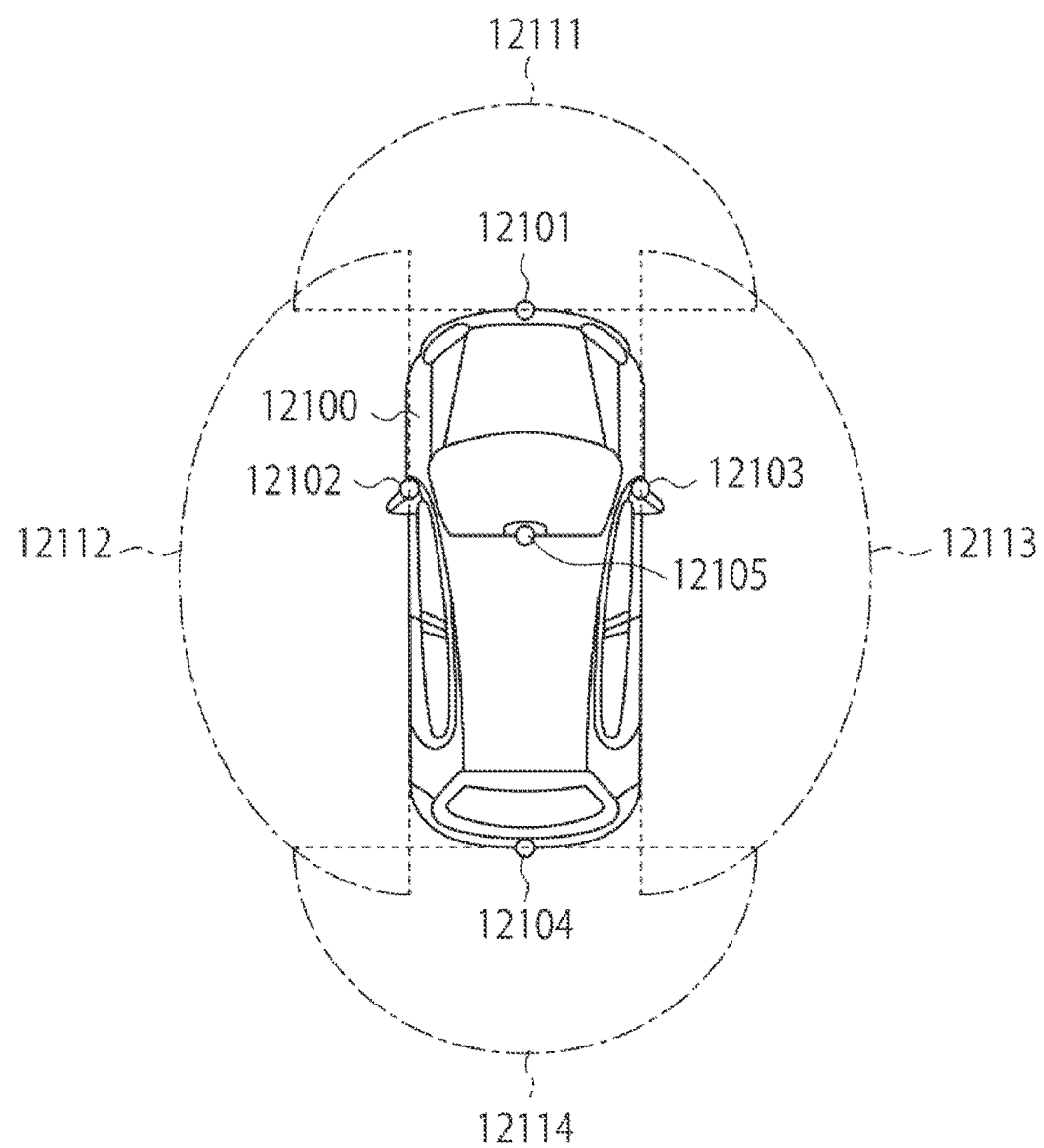
FIG. 16 is a diagram illustrating an example of an installation position of an imaging section.

FIG. 16 is a diagram illustrating an example of an installation position of the imaging section 12031.

In FIG. 16, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 16 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to, for example, the imaging section 12031 and the like among the components described in the present specification.

In general, an in-vehicle CIS requires, for example, a dynamic range of 120 dB or more, which corresponds to a range from sunlight to starry light. In this case, a plurality of photodiodes is provided in each pixel PX, the conversion efficiency for a pixel signal is changed, or the exposure time is changed, so that the dynamic range of the pixel PX is expanded. However, in order to obtain pixel signals in HDR, it is necessary to perform AD conversion on a plurality of pixel signals from one pixel PX. Applying the solid-state imaging device 100 according to the above embodiments to the imaging section 12031 and the like makes it possible to read pixel signals from such a pixel PX having HDR at a short frame rate.

Seventh Embodiment

Figure 17:
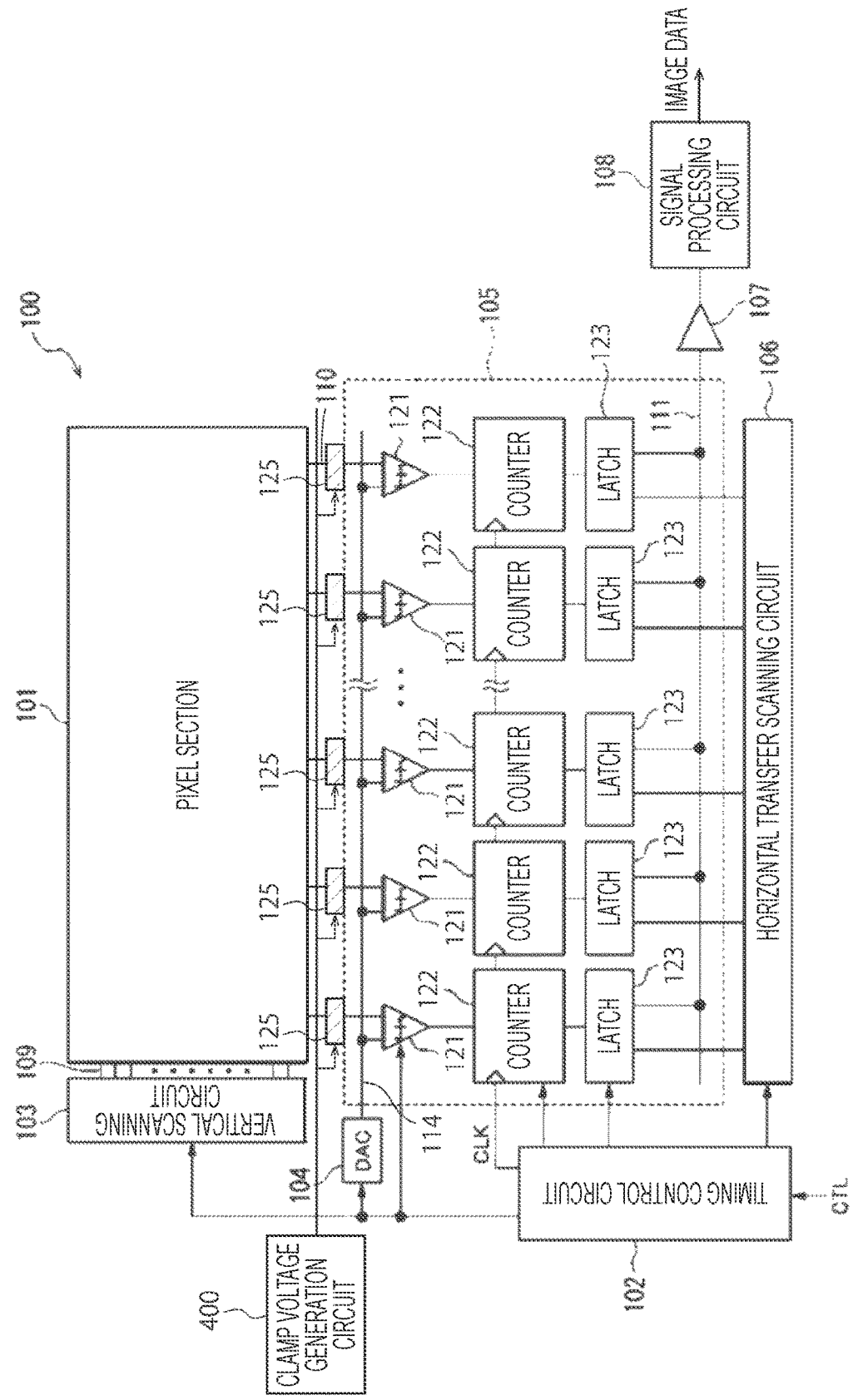
FIG. 17 is a block diagram illustrating a configuration example of a solid-state imaging device according to a seventh embodiment.

FIG. 17 is a block diagram illustrating a configuration example of a solid-state imaging device 100 according to a seventh embodiment. The solid-state imaging device 100 of the seventh embodiment further includes a clamp voltage generation circuit 400. The clamp voltage generation circuit 400 is provided in common for SH sections 125 for a plurality of columns, and applies a predetermined first voltage VgCL (see FIG. 18) to the plurality of SH sections 125.

Figure 18:
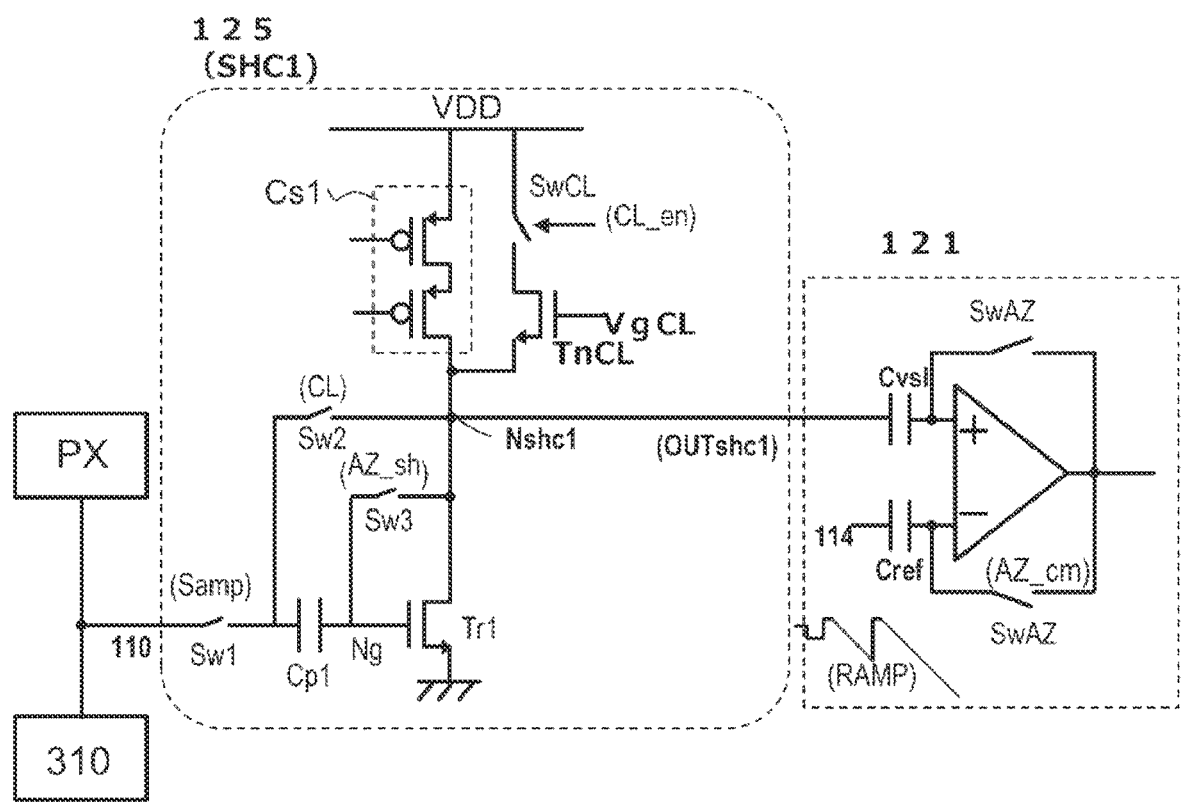
FIG. 18 is a circuit diagram illustrating a configuration example of an SH section according to the seventh embodiment.

FIG. 18 is a circuit diagram illustrating a configuration example of one SH section 125 according to the seventh embodiment. Note that, in FIG. 18, the internal configuration of a first holding circuit SHC1 of the SH section 125 is illustrated, and the configurations of a second holding circuit SHC2 and a multiplexer MUX are not illustrated. The internal configuration of the second holding circuit SHC2 may be similar to the internal configuration of the first holding circuit SHC1.

The first holding circuit SHC1 according to the seventh embodiment further includes a clamp transistor TnCL and a clamp switch SwCL. The configuration of the first holding circuit SHC1 according to the seventh embodiment other than these parts may be similar to the configuration of the first holding circuit SHC1 according to the first embodiment.

The clamp transistor TnCL and the clamp switch SwCL are connected in series between a power supply VDD and a node Nshc1, and are connected in parallel to a constant current source Cs1. The clamp transistor TnCL is, for example, an n-type transistor. The drain of the clamp transistor TnCL is connected to the power supply VDD via the clamp switch SwCL. The source of the clamp transistor TnCL is connected to the node Nshc1. The gate of the clamp transistor TnCL is connected to the clamp voltage generation circuit 400 in FIG. 17, and receives the predetermined first voltage VgCL from the clamp voltage generation circuit 400.

The clamp switch SwCL is controlled to be turned on and off by a clamp enable signal CL_en from a timing control circuit 102. When the clamp switch SwCL is brought into the on state, the clamp transistor TnCL is connected between the power supply VDD and the node Nshc1. As a result, the clamp transistor TnCL constitutes a source follower circuit, and the voltage of the node Nshc1 is set (clamped) to a clamp voltage Vclamp corresponding to the first voltage VgCL. For example, when a threshold voltage of the clamp transistor TnCL is VtCL, the clamp voltage Vclamp of the node Nshc1 is set (clamped) to VgCL−VtCL.

The reason for providing the clamp transistor TnCL is as follows.

In a case where high luminance light such as the sun is incident on a pixel PX, a large amount of charge is generated in the first photoelectric conversion section PD11a even when the first transfer gate section T12a in FIG. 3 is in the non-conductive state, and the first FD section FD15a overflows with the charge. In this case, the pixel signal VSL of the vertical signal line 110 is in the over-range state at one of the minimum value or the maximum value, a reset signal and a data signal become equal, and thus the image becomes black.

In order to suppress such blackening of an image, the pixel signal VSL is clamped at the predetermined clamp voltage Vclamp in an auto-zero period of a comparator 121 at the time of high luminance light incidence. The clamp voltage Vclamp is a voltage between the reset signal and the pixel signal VSL in the over-range state by the high luminance light. In addition, the clamp voltage Vclamp is set in advance such that a reference signal RAMP at the time of detecting the reset signal does not cross the pixel signal VSL in the over-range state by the high luminance light. As a result, the reference signal RAMP is clamped so as to be substantially equal to the clamp voltage Vclamp in the auto-zero period at the time of high luminance light incidence. Thereafter, the reset signal and the data signal are detected as usual. At this time, in a case where the pixel signal VSL is in the over-range state at the minimum value (or the maximum value), the reference signal RAMP does not cross the pixel signal VSL and cannot be detected. In this manner, in a case where the reset signal cannot be detected, a signal processing circuit 108 determines that high luminance light such as the sun is incident on the pixel PX, and sets the image to white or the like (full-coding). As a result, it is possible to suppress blackening of high luminance light such as the sun in the image. Note that, in the present embodiment, a description will be given assuming that the pixel signal VSL is brought into the over-range state at the minimum value when high luminance light is incident.

In the seventh embodiment, after the first holding circuit SHC1 samples and holds the pixel signal VSL, the comparator 121 executes an auto-zero operation. In order to clamp the reference signal RAMP to a predetermined voltage in the auto-zero operation, the clamp transistor TnCL and the clamp switch SwCL are provided at the node Nshc1 between the output of the first holding circuit SHC1 and the input of the comparator 121. As a result, the clamp transistor TnCL and the clamp switch SwCL can clamp an output signal OUTshc1 of the first holding circuit SHC1 to the clamp voltage Vclamp (Vclamp=VgCL−VtCL). Therefore, even if the pixel signal sampled by the first holding circuit SHC1 is in the over-range state by high luminance light, the clamp transistor TnCL and the clamp switch SwCL clamp the output signal OUTshc1 to the clamp voltage Vclamp, so that the reference signal RAMP does not cross the pixel signal VSL. As a result, the signal processing circuit 108 can determine that high luminance light such as the sun is incident on the pixel PX, and can suppress blackening of the high luminance light in the image.

Figure 19:
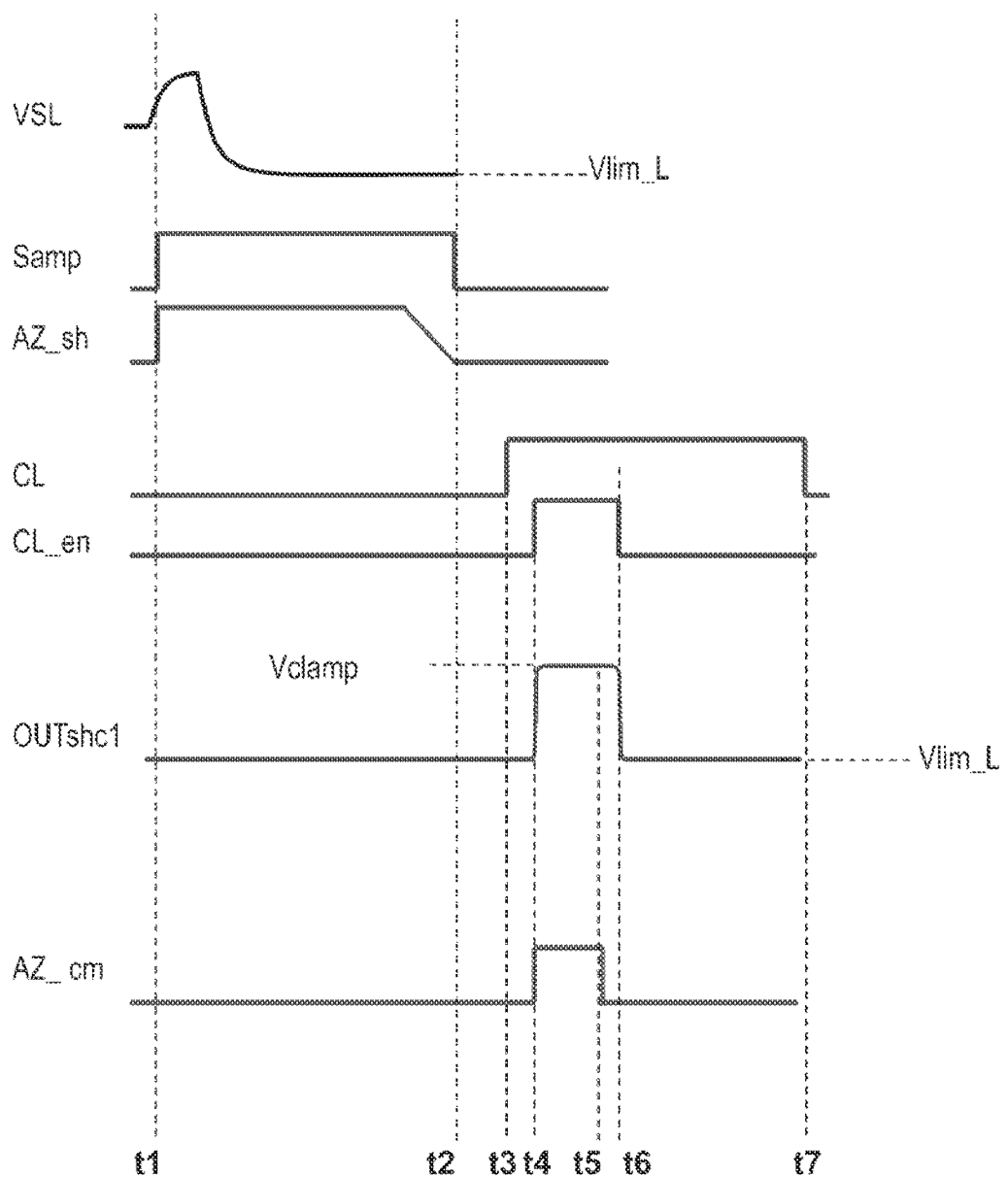
FIG. 19 is a timing chart illustrating an example of operation of detecting a reset signal by a first holding circuit and a comparator according to the seventh embodiment.

FIG. 19 is a timing chart illustrating an example of operation of detecting a reset signal by the first holding circuit SHC1 and the comparator 121 according to the seventh embodiment.

First, at t1, a signal Sample and a signal AZ_sh are raised, and switches Sw1 and Sw3 are turned on. A signal CL is kept at the low level, and a switch Sw2 is kept in the off state. As a result, the first holding circuit SHC1 samples the pixel signal VSL. The sampling period is t1 to t2.

In a case where the charge in an FD section overflows due to high luminance light, the pixel signal VSL is in the over-range state, for example, at a voltage Vlim_L as a minimum value. At this time, the voltages of the output signal OUTshc1 and a node Ng also become the voltage Vlim_L.

At t2, when the signal Sample and the signal AZ_sh are made to fall, the switches Sw1 and Sw3 are turned off, and the sampling period ends.

At t3, the signal CL is raised, and the switch Sw2 is turned on. As a result, the output voltages OUTshc1 of the nodes Nshc1 and Ng are held at the voltage Vlim_L.

At t4, an auto-zero operation of the comparator 121 is executed. A signal AZ_cm rises, and a switch SwAZ of the comparator 121 is turned on. At substantially the same time, the clamp enable signal CL_en rises, and the clamp switch SwCL is turned on. As a result, the output voltage OUTshc1 is set to the clamp voltage Vclamp (Vclamp=VgCL−VtCL). In the auto-zero operation of the comparator 121, the output voltage OUTshc1 is set to the predetermined clamp voltage Vclamp, so that a reset voltage Vrst is increased by the clamp voltage Vclamp. As a result, the voltage of the entire reference signal RAMP is also increased. As a result, the reference signal RAMP can be prevented from crossing the output voltage OUTshc1 lowered to the voltage Vlim_L as a minimum value by the high luminance light.

Figure 20:
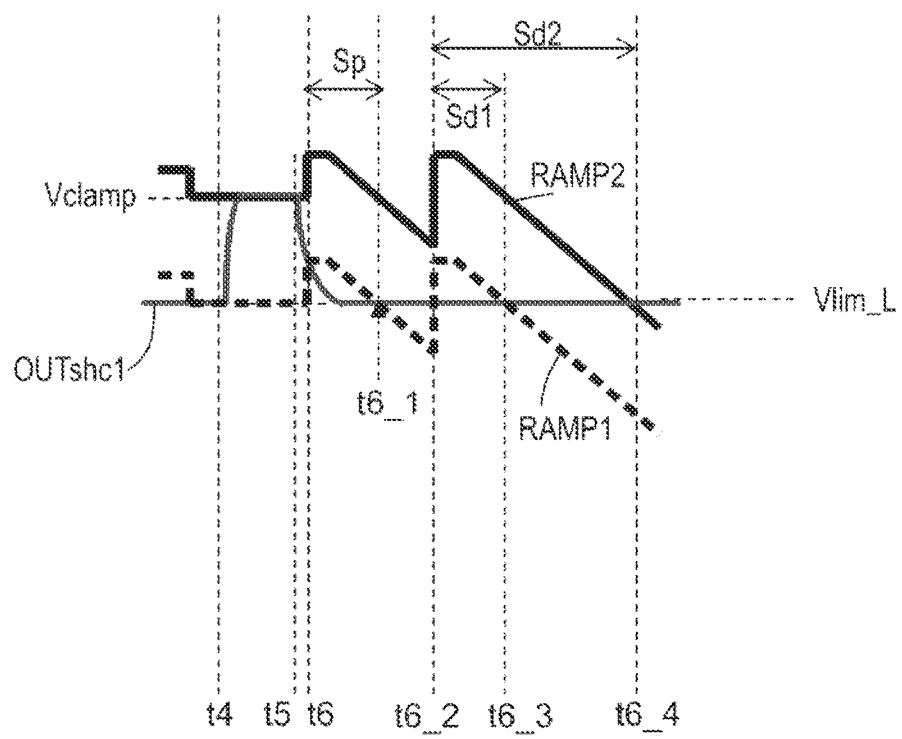
FIG. 20 is a timing chart illustrating a relationship between the voltage of an output voltage and reference signals.

For example, FIG. 20 is a timing chart illustrating a relationship between the voltage of the output voltage OUTshc1 and reference signals RAMP1 and RAMP2. The reference signal RAMP1 indicates a reference signal in a case where the clamp voltage Vclamp is not present (Vclamp=0). The reference signal RAMP2 indicates a reference signal in a case where the clamp voltage Vclamp is present (Vclamp is not 0).

In the auto-zero operation from t4 to t5, the reference signal RAMP1 is not clamped by the clamp voltage Vclamp (Vclamp=0), and thus is set to the level of the voltage Vlim_L. Therefore, time from t6 to t6_1, which is from the detection start t6 of a reset signal Sp to the time point t6_1 at which the reference signal RAMP1 crosses the output signal OUTshc1, is substantially equal to time from t6_2 to t6_3, which is from the detection start t6_2 of a data signal Sd1 to the time point t6_3 at which the reference signal RAMP1 crosses the output signal OUTshc1. That is, the reset signal Sp and the data signal Sd are substantially equal. In this case, the image is blackened by CDS processing.

On the other hand, the reference signal RAMP2 indicates a reference signal in a case where the clamp voltage Vclamp is present (Vclamp is not 0).

In this case, in the auto-zero operation from t4 to t5, the reference signal RAMP2 is clamped at the predetermined clamp voltage Vclamp (Vclamp is not 0), and is set to the level of the voltage Vlim_L+Vclamp. Therefore, in the detection period of the reset signal Sp, which is from t6 to t6_2, the reference signal RAMP2 does not cross the output signal OUTshc1. That is, the reset signal Sp is not detected. The signal processing circuit 108 fully codes the pixel signal on condition that the reset signal Sp is not detected. As a result, blackening of the image due to high luminance light can be suppressed. Note that, although a data signal Sd2 is detected as time from t6_3 to t6_4, which is from the detection start t6_2 to the time point t6_4 at which the reference signal RAMP2 crosses the output signal OUTshc1, the data signal Sd2 may be used or may not be used in the condition for full coding of the pixel signal.

As a result, the signal processing circuit 108 can determine that high luminance light is incident on the pixel PX, and can suppress blackening of the high luminance light in the image. That is, according to the seventh embodiment, blackening of an image due to high luminance light can be suppressed even when the SH sections 125 are provided.

Note that, although the reference signal RAMP is downwardly inclined in the seventh embodiment, the reference signal RAMP may be upwardly inclined. In addition, the order of detection of the reset signal Sp and the data signal Sd may be reversed.

Eighth Embodiment

Figure 21:
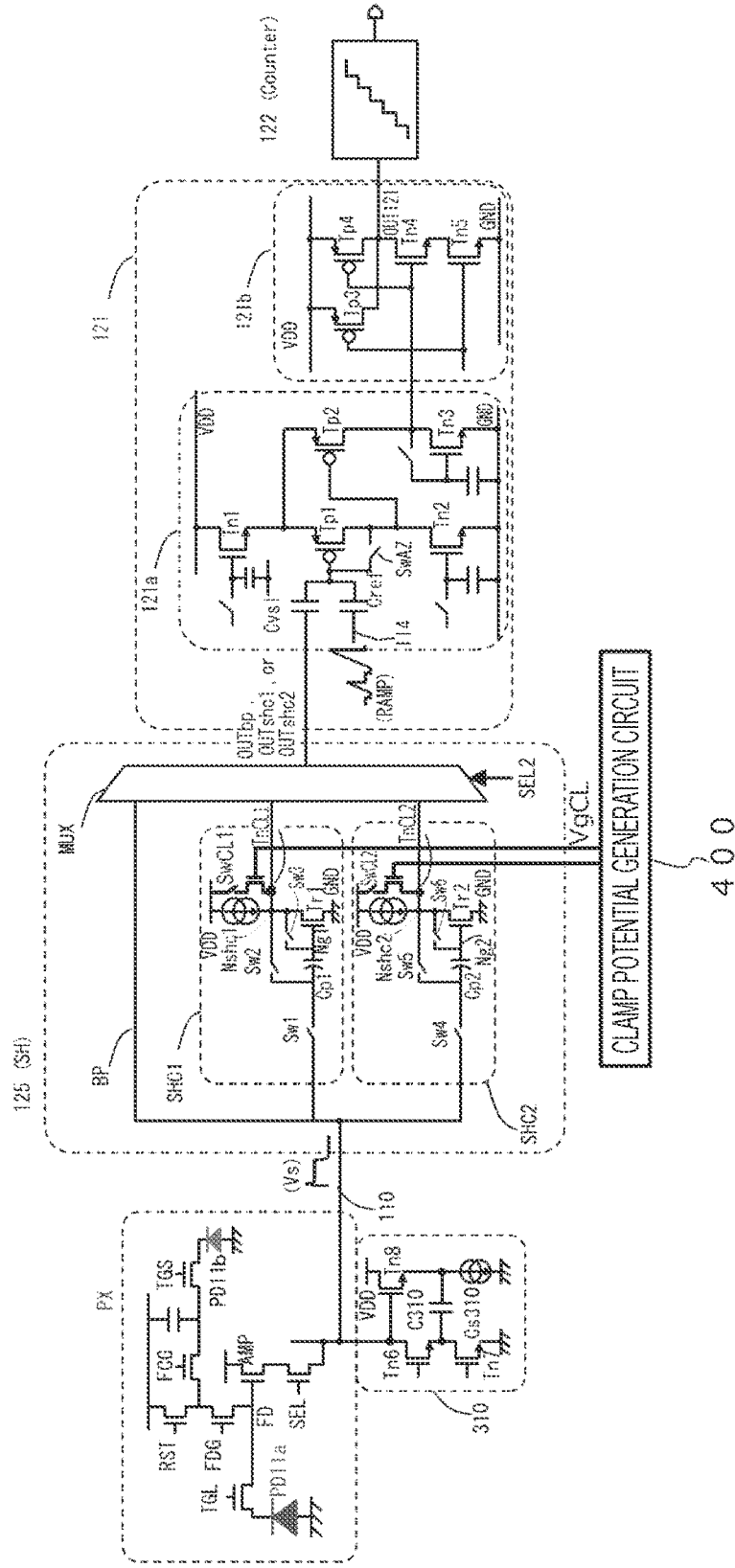
FIG. 21 is a circuit diagram illustrating a configuration example of a pixel, an SH section, and a comparator according to an eighth embodiment.

FIG. 21 is a circuit diagram illustrating a configuration example of a pixel PX, an SH section 125, and a comparator 121 according to an eighth embodiment. The eighth embodiment is an embodiment in which the SH section 125 according to the seventh embodiment is applied to each of the first and second holding circuits SHC1 and SHC2 of the first embodiment. Each of the first and second holding circuits SHC1 and SHC2 has a configuration similar to that of the first holding circuit SHC1 of the seventh embodiment. The comparator 121 has the same configuration as the comparator 121 of the first embodiment. For convenience, a clamp switch SwCL and a clamp transistor TnCL of the first holding circuit SHC1 are referred to as a clamp switch SwCL1 and a clamp transistor TnCL1, respectively. A clamp switch SwCL and a clamp transistor TnCL of the second holding circuit SHC2 are referred to as a clamp switch SwCL2 and a clamp transistor TnCL2, respectively.

The first holding circuit SHC1 further includes the clamp transistor TnCL1 and the clamp switch SwCL1 connected in series between a power supply VDD and the drain of a transistor Tr1. The clamp transistor TnCL1 and the clamp switch SwCL1 are connected in parallel to a constant current source Cs1. The second holding circuit SHC2 further includes the clamp transistor TnCL2 and the clamp switch SwCL2 connected in series between a power supply VDD and the drain of a transistor Tr2. The clamp transistor TnCL2 and the clamp switch SwCL2 are connected in parallel to a constant current source Cs2.

Furthermore, although the first and second holding circuits SHC1 and SHC2 according to the eighth embodiment are different from each other in operation timing as described above, each of the first and second holding circuits SHC1 and SHC2 basically operates similarly to the first holding circuit SHC1 of the seventh embodiment. The operation of the comparator 121 according to the eighth embodiment may be similar to the operation of the comparator 121 of the first embodiment. Therefore, according to the eighth embodiment, the effects of the first and seventh embodiments can be obtained.

Figure 22:
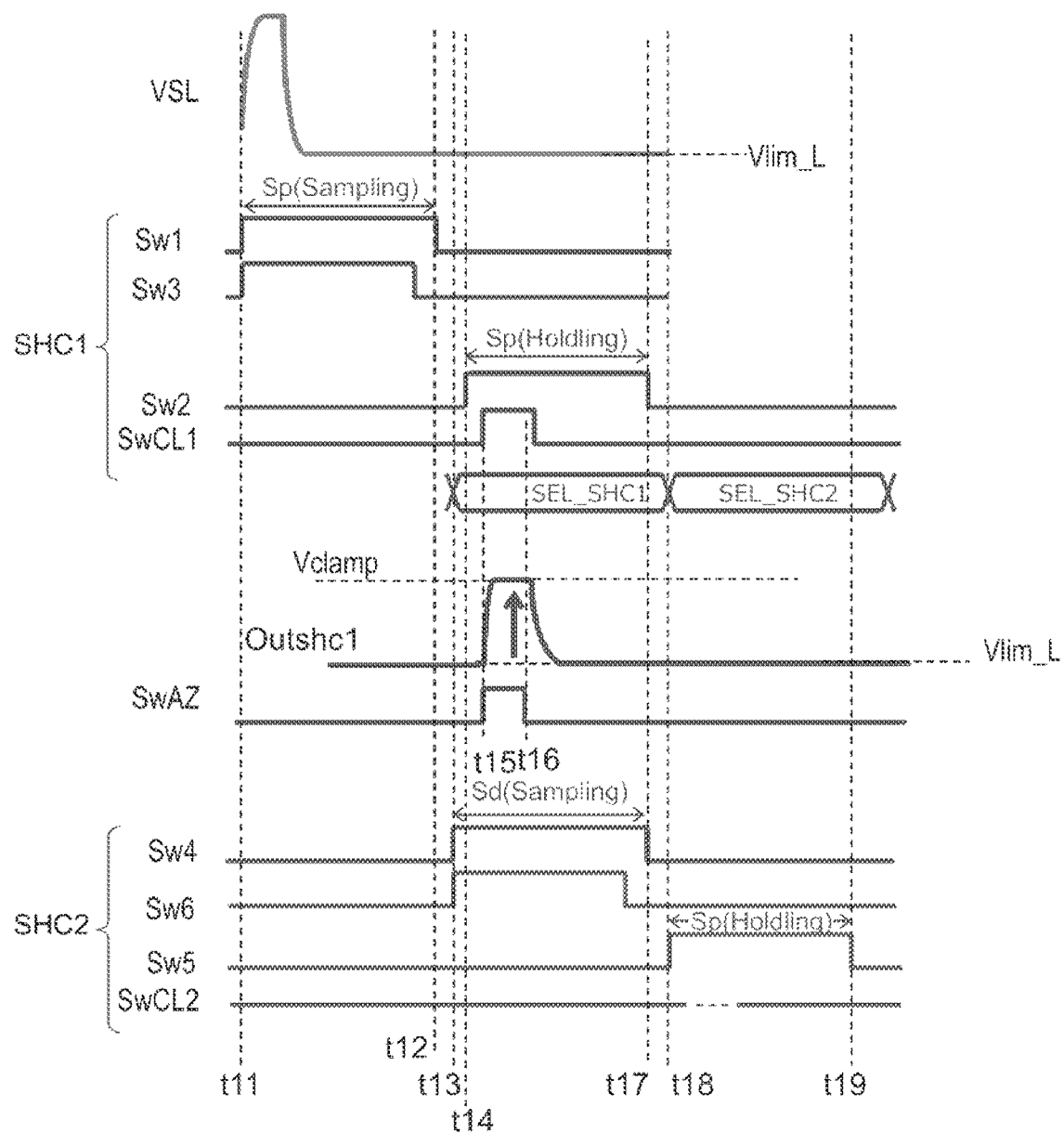
FIG. 22 is a timing chart illustrating an example of operation of detecting a reset signal and a data signal by first and second holding circuits and the comparator according to the eighth embodiment.

FIG. 22 is a timing chart illustrating an example of operation of detecting a reset signal Sp and a data signal Sd by the first and second holding circuits SHC1 and SHC2 and the comparator 121 according to the eighth embodiment. Note that, in the present embodiment, a reference signal RAMP has an upward inclination. Furthermore, in the upper part of FIG. 22, signals Sw1 to Sw3 and SwCL1 of the first holding circuit SHC1 are illustrated, and in the lower part, signals Sw4 to Sw6 and SwCL2 of the second holding circuit SHC2 are illustrated.

First, at t11, the switches Sw1 and Sw3 are turned on. The switch Sw2 is kept in the off state. As a result, the first holding circuit SHC1 starts sampling a pixel signal VSL.

In a case where the charge in an FD section overflows due to high luminance light, the pixel signal VSL is in the over-range state, for example, at a voltage Vlim_L as a minimum value. At this time, the voltages of an output signal OUTshc1 and a node Ng1 also become the voltage Vlim_L.

At t12, the switches Sw1 and Sw3 are turned off, and the sampling period of the pixel signal VSL ends.

At t13, the switches Sw4 and Sw6 of the second holding circuit SHC2 are turned on. The switch Sw5 is kept in the off state. As a result, the second holding circuit SHC2 starts sampling the pixel signal VSL.

At t14, the switch Sw2 of the first holding circuit SHC1 is turned on, and the first holding circuit SHC1 holds the output signal OUTshc1. At this time, the output signal OUTshc1 is held at the voltage Vlim_L. In addition, a selection signal SEL_SHC1 is selectively activated, and a multiplexer MUX outputs the output signal OUTshc1 of the first holding circuit SHC1 to the comparator 121.

At t15, the clamp switch SwCL1 and an auto-zero switch SwAZ are turned on. As a result, an auto-zero operation of the comparator 121 is executed, and the transistor TnCL1 sets the drain of the transistor Tr1 to a clamp voltage Vclamp corresponding to a first voltage VgCL. As a result, the output signal OUTshc1 of the first holding circuit SHC1 is clamped by the clamp voltage Vclamp. In a state where the output signal OUTshc1 is clamped to a voltage (Vlim_L+Vclamp), the auto-zero operation of the comparator 121 is executed. The auto-zero operation of the present embodiment will be described later.

At t16, the clamp switch SwCL1 and the auto-zero switch SwAZ are turned off. As a result, the auto-zero operation of the comparator 121 and the clamping operation end. Therefore, the output signal OUTshc1 returns to the voltage Vlim_L.

From t16 to t17, the first holding circuit SHC1 holds the output signal OUTshc1 at the voltage Vlim_L, and the comparator 121 attempts to detect the voltage Vlim_L as the reset signal Sp. However, in the auto-zero operation from t15 to t16, the output signal OUTshc1 is set to the clamp voltage Vclamp. Therefore, as will be described later with reference to FIG. 23, the voltage Vlim_L in the over-range state by high luminance light does not cross the clamped reference signal RAMP, and the reset signal Sp is not detected. A signal processing circuit 108 determines that high luminance light is incident on the basis of the fact that the reset signal Sp is desired to be detected.

At t17, the switch Sw2 is turned off to release the holding state of the output signal OUTshc1 by the first holding circuit SHC1, and the switch Sw4 is turned off to end the sampling period of the second holding circuit SHC2.

At t18, the switch Sw5 of the second holding circuit SHC2 is turned on, and the second holding circuit SHC2 holds an output signal OUTshc2. At this time, the output signal OUTshc2 is held at the voltage Vlim_L. In addition, a selection signal SEL_SHC2 is selectively activated, and the multiplexer MUX outputs the output signal OUTshc2 of the second holding circuit SHC1 to the comparator 121.

From t18 to t19, the second holding circuit SHC2 holds the output signal OUTshc2 at the voltage Vlim_L, and the comparator 121 detects the voltage Vlim_L as the data signal Sd.

Figure 23:
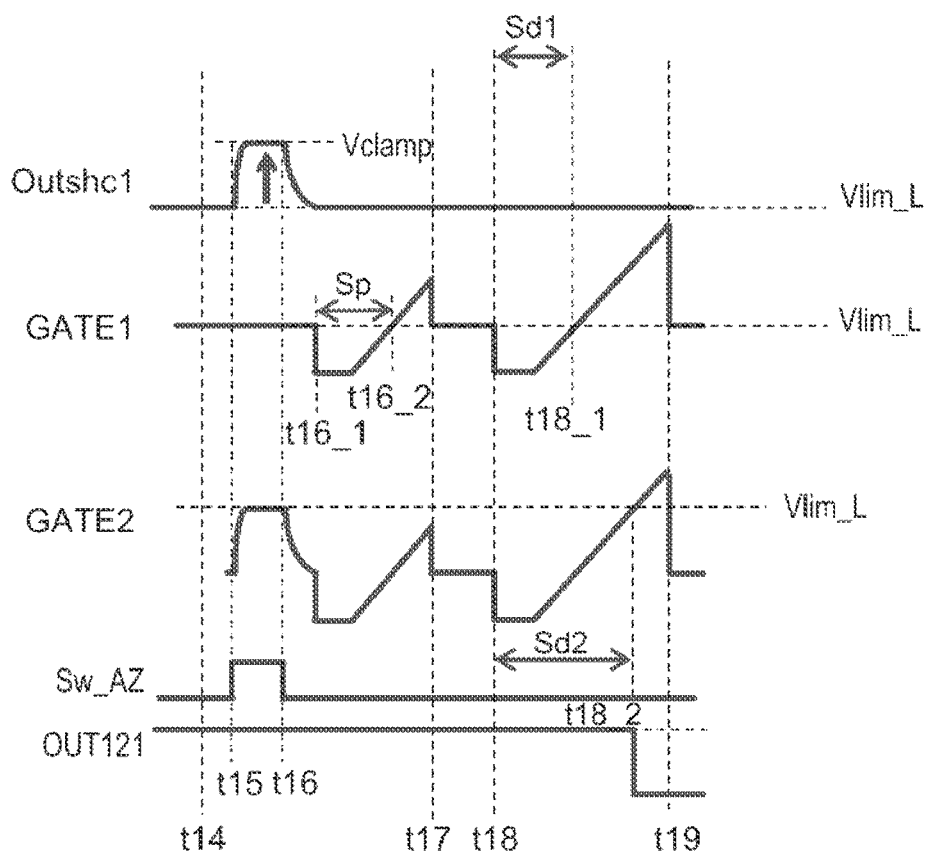
FIG. 23 is a timing chart illustrating a relationship between an output voltage and reference signals.

FIG. 23 is a timing diagram illustrating a relationship between the output voltage OUTshc1 and gate signals GATE1 and GATE2. The gate signal GATE1 indicates a gate signal of the transistor Tp1 (comparator input: comparison reference signal) in a case where the clamp voltage Vclamp is not applied (Vclamp=0). The gate signal GATE2 indicates a gate signal of the transistor Tp1 (comparator input: comparison reference signal) in a case where the clamp voltage Vclamp is applied (Vclamp is not 0). Therefore, each of the gate signals GATE1 and GATE2 is a capacitance addition signal of the reference signal RAMP and a signal input to a capacitor Cvs1. Note that, in the present embodiment, the reference signal RAMP has an upward inclination, and the gate signals GATE1 and GATE2 similarly have an upward inclination.

In the auto-zero operation from t14 to t15, the gate signal GATE1 is not clamped by the clamp voltage Vclamp (Vclamp=0), and thus is set to the level of the voltage Vlim_L. Therefore, time from t16_1 to t16_2, which is from the detection start t16_1 of the reset signal Sp to the inversion reference point t16_2 at which the gate signal GATE1 crosses the output signal OUTshc1, is substantially equal to time from t18 to t18_1, which is from the detection start t18 of a data signal Sd1 to the time t18_1 at which the gate signal GATE1 crosses the output signal OUTshc1. That is, the reset signal Sp and the data signal Sd are substantially equal. In this case, the image is blackened by CDS processing.

On the other hand, the gate signal GATE2 indicates a gate signal of the transistor Tp1 in a case where the clamp voltage Vclamp is present (Vclamp is not 0).

In this case, in the auto-zero operation from t14 to t15, the gate signal GATE2 is clamped at the predetermined clamp voltage Vclamp (Vclamp is not 0), and is set to the level of the voltage Vlim_L−Vclamp. Therefore, in the detection period of the reset signal Sp, which is from t16_1 to t17, the gate signal GATE2 does not cross the output signal OUTshc1. That is, the reset signal Sp is not detected. The signal processing circuit 108 fully codes the pixel signal on condition that the reset signal Sp is not detected. As a result, blackening of the image due to high luminance light can be suppressed. Note that, although a data signal Sd2 is detected as time from t18 to t18_2, which is from the detection start t18 to the time point t18_2 at which the gate signal GATE2 crosses the output signal OUTshc1, the data signal Sd2 may be used or may not be used in the condition for full coding of the pixel signal.

As a result, the signal processing circuit 108 can determine that high luminance light is incident on the pixel PX, and can suppress blackening of the high luminance light in the image. That is, according to the eighth embodiment, even in a case where the first holding circuit SHC1 holds the reset signal Sp and the second holding circuit SHC2 holds the data signal Sd, blackening of an image due to high luminance light can be suppressed.

Note that, in the eighth embodiment, the order of detection of the reset signal Sp and the data signal Sd may be reversed. In this case, in the auto-zero operation, when the clamp switch SwCL2 of the second holding circuit SHC2 is turned on, the clamp transistor TnCL2 may set the drain of the transistor Tr2 to the clamp voltage Vclamp. In this case, the reference signal RAMP is clamped when the output signal OUTshc2 from the clamp transistor TnCL2 is detected.

The eighth embodiment can be applied to reading of each of the high-sensitivity reset signal NH2, the high-sensitivity reset signal NH1, the high-sensitivity data signal SH1, the high-sensitivity data signal SH2, the low-sensitivity data signal SL, and the low-sensitivity reset signal NL. Therefore, in the eighth embodiment, blackening of an image of these signals due to high luminance light can be suppressed.

Ninth Embodiment

Figure 24:
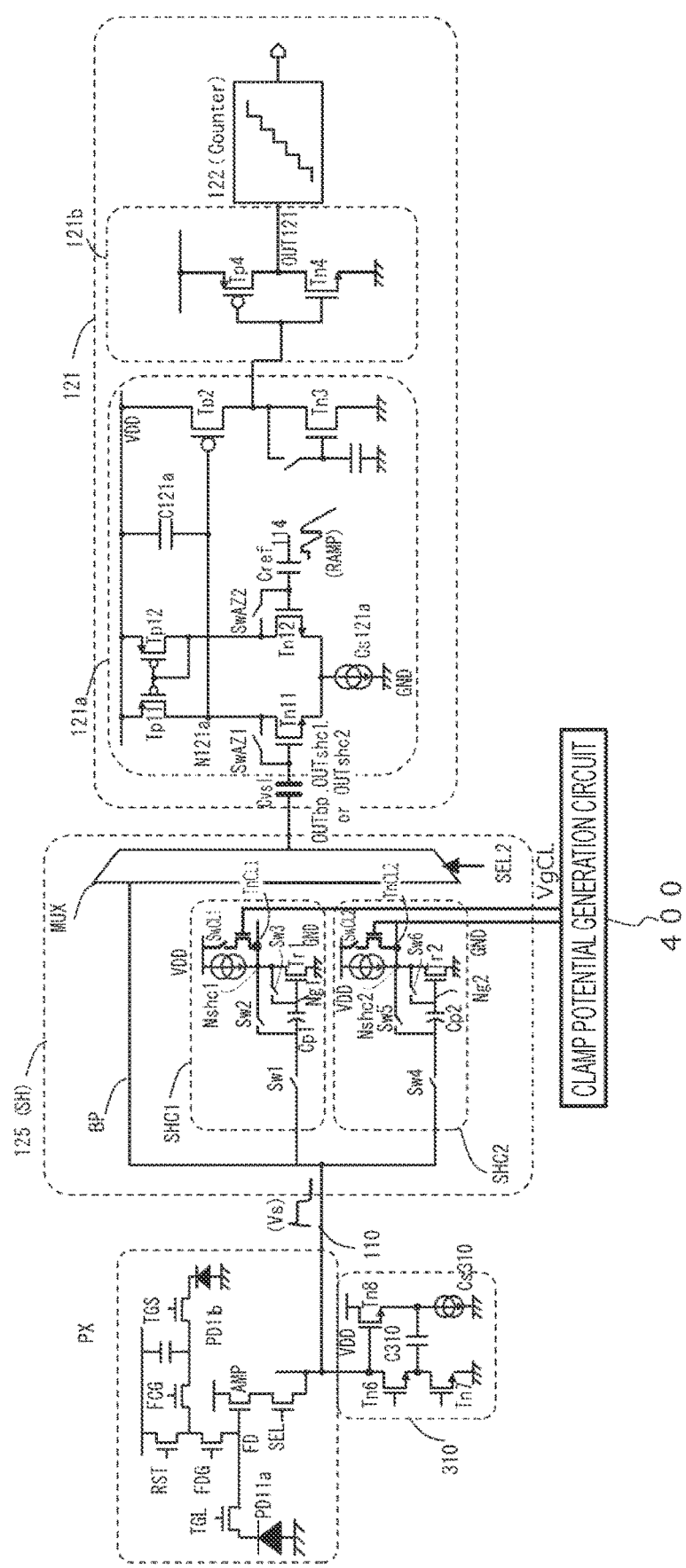
FIG. 24 is a circuit diagram illustrating a configuration example of a pixel, an SH section, and a comparator according to a ninth embodiment.

FIG. 24 is a circuit diagram illustrating a configuration example of a pixel PX, an SH section 125, and a comparator 121 according to a ninth embodiment. The ninth embodiment is an embodiment in which the SH section 125 according to the seventh embodiment is applied to the second embodiment. Each of first and second holding circuits SHC1 and SHC2 has the same configuration as the first holding circuit SHC1 of the seventh embodiment. The comparator 121 has the same configuration as the comparator 121 of the second embodiment.

Although the operations of the first and second holding circuits SHC1 and SHC2 according to the ninth embodiment are different from each other in operation timing, each of the first and second holding circuits SHC1 and SHC2 basically operates similarly to the first holding circuit SHC1 of the seventh embodiment. The operation of the comparator 121 according to the ninth embodiment is similar to the operation of the comparator 121 of the second embodiment. Therefore, according to the ninth embodiment, the effects of the second and seventh embodiments can be obtained.

Tenth Embodiment

Figure 25:
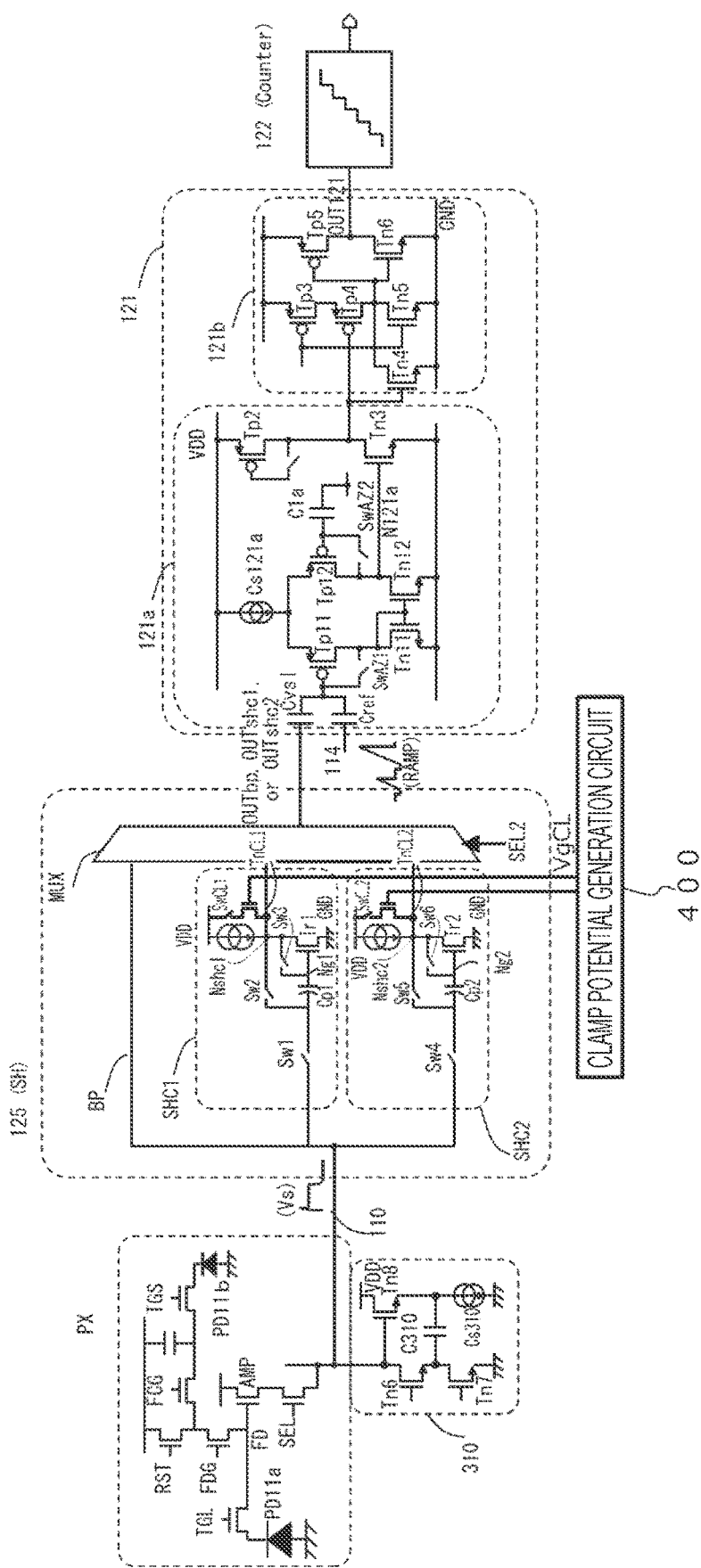
FIG. 25 is a circuit diagram illustrating a configuration example of a pixel, an SH section, and a comparator according to a tenth embodiment.

FIG. 25 is a circuit diagram illustrating a configuration example of a pixel PX, an SH section 125, and a comparator 121 according to a tenth embodiment. The tenth embodiment is an embodiment in which the SH section 125 according to the seventh embodiment is applied to the third embodiment. Each of first and second holding circuits SHC1 and SHC2 has the same configuration as the first holding circuit SHC1 of the seventh embodiment. The comparator 121 has the same configuration as the comparator 121 of the third embodiment.

Although the operations of the first and second holding circuits SHC1 and SHC2 according to the tenth embodiment are different from each other in operation timing, each of the operations is basically similar to the operation of the first holding circuit SHC1 of the seventh embodiment. The operation of the comparator 121 according to the tenth embodiment may be similar to the operation of the comparator 121 of the third embodiment. Therefore, according to the tenth embodiment, the effects of the third and seventh embodiments can be obtained.

Eleventh Embodiment

Figure 26:
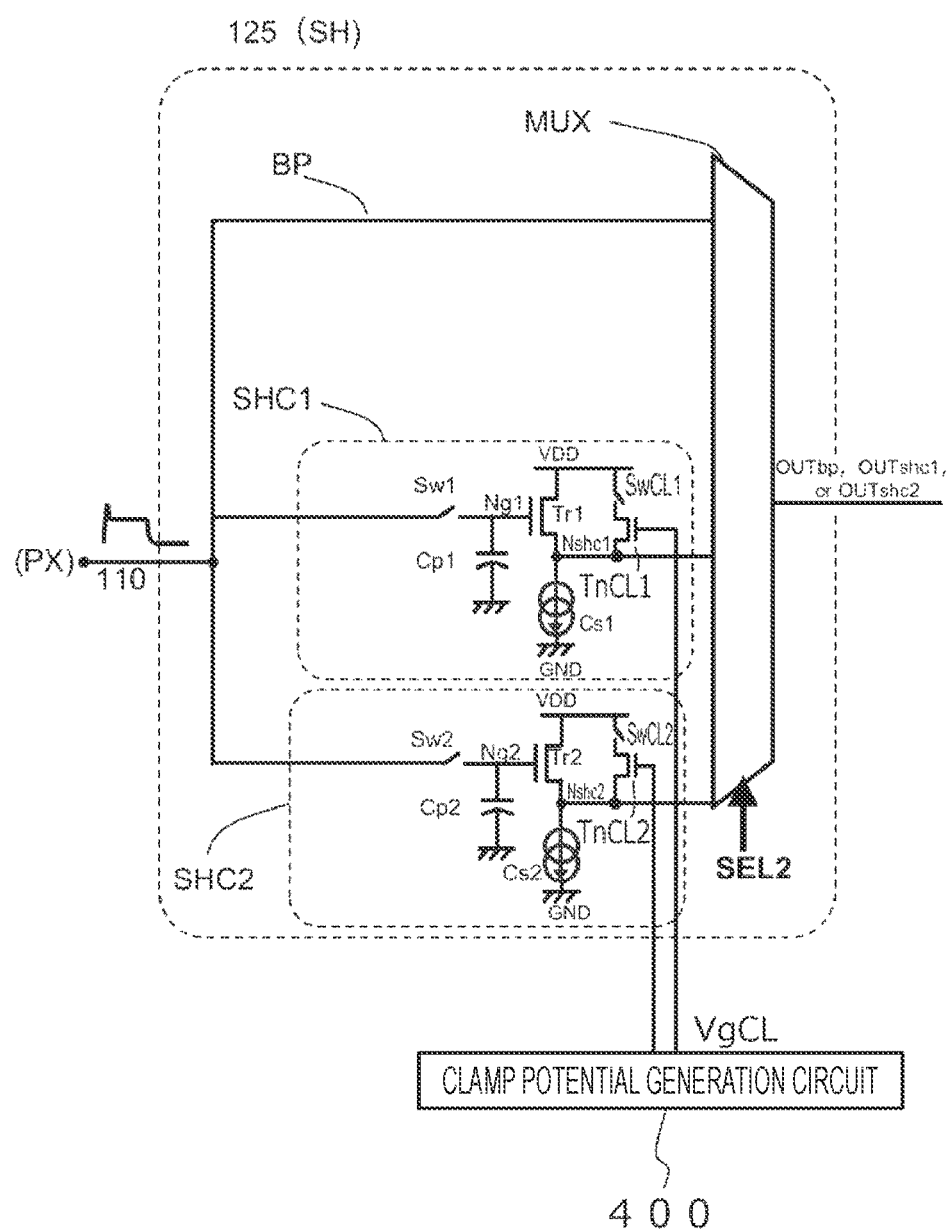
FIG. 26 is a circuit diagram illustrating a configuration example of an SH section according to an eleventh embodiment.

FIG. 26 is a circuit diagram illustrating a configuration example of an SH section 125 according to an eleventh embodiment. The eleventh embodiment is an embodiment in which the SH section 125 according to the seventh embodiment is applied to the fourth embodiment.

Each operation of the SH section 125 according to the eleventh embodiment is basically similar to the operation of the SH section 125 of the seventh embodiment. Therefore, according to the eleventh embodiment, the effects of the fourth and seventh embodiments can be obtained.

Note that the present technology can have the following configurations.

(1)

A solid-state imaging device including:
  a pixel section including photoelectric conversion elements that photoelectrically convert incident light into pixel signals;
  an AD conversion section that converts the pixel signals from the pixel section into digital signals; a first holding circuit that is provided between the pixel section and the AD conversion section and holds the pixel signals;
  a second holding circuit that is provided between the pixel section and the AD conversion section and holds the pixel signals; and
  a selection circuit that is capable of connecting any one of the first and second holding circuits to the AD conversion section and selectively transmits the pixel signals held in the first or second holding circuit to the AD conversion section.

(2)

The solid-state imaging device according to (1), further including
  a bypass signal line that is provided between the pixel section and the AD conversion section and transmits the pixel signals as it is, in which
  the selection circuit is capable of connecting any one of the first holding circuit, the second holding circuit, and the bypass signal line to the AD conversion section, and selectively transmits, to the AD conversion section, the pixel signals held in the first holding circuit, the pixel signals held in the second holding circuit, or the pixel signals transmitted through the bypass signal line.

(3)

The solid-state imaging device according to (1) or (2), in which the first holding circuit includes:
a first capacitor having one end connected to the pixel section, the first capacitor being capable of accumulating the pixel signals; and
a first transistor having a gate connected to another end of the first capacitor and a drain connected to a current source and the selection circuit, and
the second holding circuit includes:
a second capacitor having one end connected to the pixel section, the second capacitor being capable of accumulating the pixel signals; and
a second transistor having a gate connected to another end of the second capacitor and a drain connected to a current source and the selection circuit.

(4)

The solid-state imaging device according to (3), in which the first holding circuit includes:
a first switch provided between the first capacitor and the pixel section;
a second switch connected between the drain of the first transistor and the one end of the first capacitor; and
a third switch connected between the drain of the first transistor and the another end of the first capacitor, and
the second holding circuit includes:
a fourth switch provided between the second capacitor and the pixel section;
a fifth switch connected between the drain of the second transistor and the one end of the second capacitor; and
a sixth switch connected between the drain of the second transistor and the another end of the second capacitor.

(5)

The solid-state imaging device according to (4), in which the first and third switches are brought into a conductive state and the second switch is in a non-conductive state when the pixel signals are sampled from the pixel section to the first capacitor,
the first and third switches are brought into a non-conductive state and the second switch is brought into a conductive state when the first capacitor holds the pixel signals,
the fourth and sixth switches are brought into a conductive state and the fifth switch is in a non-conductive state when the pixel signals are sampled from the pixel section to the second capacitor, and
the fourth and sixth switches are brought into a non-conductive state and the fifth switch is brought into a conductive state when the second capacitor holds the pixel signals.

(6)

The solid-state imaging device according to (5), in which the first and second holding circuits sample the pixel signals at different timings.

(7)

The solid-state imaging device according to (5) or (6), in which
during a period in which the first holding circuit holds a first pixel signal among the pixel signals and the selection circuit outputs the first pixel signal from the first holding circuit to the AD conversion section, the second holding circuit samples a second pixel signal among the pixel signals, and
during a period in which the second holding circuit holds the second pixel signal and the selection circuit outputs the second pixel signal from the second holding circuit to the AD conversion section, the first holding circuit samples another pixel signal among the pixel signals.

(8)

The solid-state imaging device according to (1) or (2), in which
the first holding circuit includes:
a first capacitor having one end connected to the pixel section and another end connected to a reference voltage source, the first capacitor being capable of storing the pixel signals;
a first transistor having a gate connected to the one end of the first capacitor and a source connected to a current source and the selection circuit, and
the second holding circuit includes:
a second capacitor having one end connected to the pixel section and another end connected to a reference voltage source, the second capacitor being capable of accumulating the pixel signals; and
a second transistor having a gate connected to the one end of the second capacitor and a source connected to a current source and the selection circuit.

(9)

The solid-state imaging device according to (8), in which
the first holding circuit includes a first switch provided between the one end of the first capacitor and the pixel section, and
the second holding circuit includes a second switch provided between the one end of the second capacitor and the pixel section.

(10)

The solid-state imaging device according to (9), in which
the first switch is brought into a conductive state when the pixel signals are sampled from the pixel section to the first capacitor,
the first switch is brought into a non-conductive state when the first capacitor holds the pixel signals,
the second switch is brought into a conductive state when the pixel signals are sampled from the pixel section to the second capacitor, and
the second switch is brought into a non-conductive state when the second capacitor holds the pixel signals.

(11)

The solid-state imaging device according to (10), in which the first and second capacitors sample the pixel signals at different timings.

(12)

The solid-state imaging device according to (10) or (11), in which
during a period in which the first holding circuit holds a first pixel signal among the pixel signals and the selection circuit outputs the first pixel signal from the first holding circuit to the AD conversion section, the second holding circuit samples a second pixel signal among the pixel signals, and
during a period in which the second holding circuit holds the second pixel signal and the selection circuit outputs the second pixel signal from the second holding circuit to the AD conversion section, the first holding circuit samples another pixel signal among the pixel signals.

(13)

The solid-state imaging device according to any one of (1) to (12), further including a negative capacitance circuit connected to a first signal line that is connected between the pixel section and the first and second holding circuits and transmits the pixel signals, in which the negative capacitance circuit includes:

an amplifier having an input terminal connected to the first signal line; and a capacitor connected between the input terminal and an output terminal of the amplifier.

(14)

The solid-state imaging device according to any one of (1) to (13), in which each pixel of the pixel section includes first and second photoelectric conversion elements having different light receiving areas.

(15)

The solid-state imaging device according to any one of (1) to (14), in which each pixel of the pixel section includes:

first and second floating diffusion layers each of which accumulates a charge from the photoelectric conversion elements;

an amplification transistor that outputs the pixel signals based on a potential of the first floating diffusion layer; and a seventh switch provided between the first floating diffusion layer and the second floating diffusion layer, the amplification transistor outputs the pixel signals based on the potential of the first floating diffusion layer when the seventh switch is brought into a non-conductive state, and the amplification transistor outputs the pixel signals based on a potential of a region where the first and second floating diffusion layers are coupled when the seventh switch is brought into a conductive state.

(16)

The solid-state imaging device according to any one of (3) to (7), in which the first holding circuit further includes a third transistor and an eighth switch connected in series between a power supply and the drain of the first transistor, and the second holding circuit further includes a fourth transistor and a ninth switch connected in series between the power supply and the drain of the second transistor.

(17)

The solid-state imaging device according to (16), in which the third transistor and the eighth switch are connected in parallel to the current source, and the fourth transistor and the ninth switch are connected in parallel to the current source.

(18)

The solid-state imaging device according to (16) or (17), further including a voltage generation circuit that applies a predetermined first voltage to gates of the third and fourth transistors, in which the third transistor sets the drain of the first transistor to a clamp voltage corresponding to the first voltage when the eighth switch is in a conductive state, and the fourth transistor sets the drain of the second transistor to the clamp voltage when the ninth switch is in a conductive state.

(19)

The solid-state imaging device according to any one of (16) to (18), in which the eighth switch is brought into a conductive state in an auto-zero operation of equalizing the pixel signals that are held by the first holding circuit and compared in the AD conversion section and a reference signal, and the ninth switch is brought into conductive state in an auto-zero operation of equalizing the pixel signals that are held by the second holding circuit and compared in the AD conversion section and the reference signal.

Note that the present disclosure is not limited to the above-described embodiments, and various modifications can be made without departing from the gist of the present disclosure. Furthermore, the effects described in the present specification are merely examples and are not limited, and other effects may be provided.

REFERENCE SIGNS LIST

PX Pixel
125 SH section
121 Comparator
SHC1 First holding circuit
SHC2 Second holding circuit
BP Bypass signal line
MUX Multiplexer
Cp1, Cp2 Capacitor
Tr1, Tr2 Transistor
Sw1 to Sw6 Switch
Cs1, Cs2 Constant current source

The invention claimed is:

1. A solid-state imaging device comprising:
a pixel circuit including photoelectric conversion elements that photoelectrically convert incident light into pixel signals;
an AD conversion circuit that converts the pixel signals from the pixel circuit into digital signals;
a holding circuit that is provided between the pixel circuit and the AD conversion circuit and holds the pixel signals; and
a selection circuit configured to selectively connect the pixel circuit and the holding circuit to the AD conversion circuit to selectively transmit the pixel signals from the pixel circuit or the holding circuit to the AD conversion circuit,
wherein the holding circuit comprises a first amplification transistor, and
the pixel circuit further comprises:
a first transfer gate;
a floating diffusion coupled to the pixel circuit via the first transfer gate;
a second transfer gate;
a third transfer gate arranged between the floating diffusion and a first end of the second transfer gate;
a capacitor coupled to a second end of the second transfer gate; and
a second amplification transistor including a first end coupled to the floating diffusion and a second end that outputs the pixel signals,
wherein the second end of the second amplification transistor is coupled to the first amplification transistor.

2. The solid-state imaging device according to claim 1, wherein the first transfer gate, the second transfer gate and the third transfer gate respectively comprise a transistor.

3. The solid-state imaging device according to claim 1, wherein
the holding circuit comprises a first holding circuit that holds the pixel signals and a second holding circuit that holds the pixel signals, and the selection circuit is configured to selectively connect the first holding circuit, the second holding circuit, and the pixel circuit to the AD conversion circuit to selectively transmit the pixel signals from the first holding circuit, the second holding circuit, or the pixel circuit to the AD conversion circuit.

4. The solid-state imaging device according to claim 3, further comprising:
a bypass signal line arranged between the pixel circuit and the AD conversion circuit and transmits the pixel signals as it is, wherein
the selection circuit is configured to selectively connect any one of the first holding circuit, the second holding circuit, and the bypass signal line to the AD conversion circuit to selectively transmits the pixel signals from the first holding circuit, the second holding circuit, or the bypass signal line to the AD conversion circuit.

5. The solid-state imaging device according to claim 3, wherein
the first holding circuit includes:
a first capacitor having a first end connected to the pixel circuit, the first capacitor being configured to accumulate the pixel signals; and
a first transistor having a gate connected to a second end of the first capacitor and a drain connected to a current source and the selection circuit, and
the second holding circuit includes:
a second capacitor having a first end connected to the pixel circuit, the second capacitor being configured to accumulate the pixel signals; and
a second transistor having a gate connected to a second end of the second capacitor and a drain connected to a current source and the selection circuit.

6. The solid-state imaging device according to claim 5, wherein
the first holding circuit includes:
a first switch provided between the first capacitor and the pixel circuit;
a second switch connected between the drain of the first transistor and the first end of the first capacitor; and
a third switch connected between the drain of the first transistor and the second end of the first capacitor, and
the second holding circuit includes:
a fourth switch provided between the second capacitor and the pixel circuit;
a fifth switch connected between the drain of the second transistor and the first end of the second capacitor; and
a sixth switch connected between the drain of the second transistor and the second end of the second capacitor.

7. The solid-state imaging device according to claim 6, wherein
the first and third switches are brought into a conductive state and the second switch is in a non-conductive state when the pixel signals are sampled from the pixel circuit to the first capacitor,
the first and third switches are brought into a non-conductive state and the second switch is brought into a conductive state when the first capacitor holds the pixel signals,
the fourth and sixth switches are brought into a conductive state and the fifth switch is in a non-conductive state when the pixel signals are sampled from the pixel circuit to the second capacitor, and
the fourth and sixth switches are brought into a non-conductive state and the fifth switch is brought into a conductive state when the second capacitor holds the pixel signals.

8. The solid-state imaging device according to claim 7, wherein the first and second holding circuits sample the pixel signals at different timings.

9. The solid-state imaging device according to claim 7, wherein
during a period in which the first holding circuit holds a first pixel signal among the pixel signals and the selection circuit outputs the first pixel signal from the first holding circuit to the AD conversion circuit, the second holding circuit samples a second pixel signal among the pixel signals, and
during a period in which the second holding circuit holds the second pixel signal and the selection circuit outputs the second pixel signal from the second holding circuit to the AD conversion circuit, the first holding circuit samples another pixel signal among the pixel signals.

10. The solid-state imaging device according to claim 3, further comprising:
a negative capacitance circuit connected to a first signal line that is connected between the pixel circuit and the first and second holding circuits and transmits the pixel signals, wherein
the negative capacitance circuit includes:
an amplifier having an input terminal connected to the first signal line; and
a capacitor connected between the input terminal and an output terminal of the amplifier.

11. The solid-state imaging device according to claim 3, wherein
the first holding circuit further includes
a third transistor and an eighth switch connected in series between a power supply and a drain of the first transistor, and
the second holding circuit further includes
a fourth transistor and a ninth switch connected in series between the power supply and the drain of the second transistor.

12. The solid-state imaging device according to claim 11, wherein
the third transistor and the eighth switch are connected in parallel to a current source, and
the fourth transistor and the ninth switch are connected in parallel to the current source.

13. The solid-state imaging device according to claim 11, further comprising:
a voltage generation circuit that applies a predetermined first voltage to gates of the third and fourth transistors, wherein
the third transistor sets the drain of the first transistor to a clamp voltage corresponding to the first voltage when the eighth switch is in a conductive state, or
the fourth transistor sets the drain of the second transistor to the clamp voltage when the ninth switch is in a conductive state.

14. The solid-state imaging device according to claim 11, wherein
the eighth switch is brought into a conductive state in an auto-zero operation of equalizing the pixel signals that are held by the first holding circuit and compared in the AD conversion circuit and a comparison reference signal, and
the ninth switch is brought into conductive state in an auto-zero operation of equalizing the pixel signals that are held by the second holding circuit and compared in the AD conversion circuit and the comparison reference signal.

15. The solid-state imaging device according to claim 1, wherein the pixel circuit includes first and second photoelectric conversion elements having different light receiving areas.

16. The solid-state imaging device according to claim 1, wherein
the pixel circuit includes:
first and second floating diffusion layers each of which accumulates a charge from the photoelectric conversion elements;
a seventh switch provided between the first floating diffusion layer and the second floating diffusion layer, wherein
the pixel signals are based on a potential of the first floating diffusion layer when the seventh switch is brought into a non-conductive state, and based upon a potential of a region where the first and second floating diffusion layers are coupled when the seventh switch is brought into a conductive state.

* * * * *